(12) United States Patent
Grom

(10) Patent No.: US 11,120,671 B2
(45) Date of Patent: Sep. 14, 2021

(54) METHODS, SYSTEMS, AND APPARATUS FOR BI-DIRECTIONAL COMMUNICATION WITH WEARABLE LOCATION DEVICES

(71) Applicant: ZEBRA TECHNOLOGIES CORPORATION, Lincolnshire, IL (US)

(72) Inventor: Robert A. Grom, Hawthorn Woods, IL (US)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

(21) Appl. No.: 16/596,979

(22) Filed: Oct. 9, 2019

(65) Prior Publication Data
US 2020/0043300 A1    Feb. 6, 2020

Related U.S. Application Data

(63) Continuation of application No. 15/810,643, filed on Nov. 13, 2017, now Pat. No. 10,482,726.

(51) Int. Cl.
*G08B 5/38* (2006.01)
*H04W 4/02* (2018.01)
(Continued)

(52) U.S. Cl.
CPC .............. *G08B 5/38* (2013.01); *A41D 1/002* (2013.01); *A42B 3/0433* (2013.01); *A42B 3/30* (2013.01);
(Continued)

(58) Field of Classification Search
CPC .... A41D 1/002; A41D 27/085; A42B 3/0433; A42B 3/30; A63B 43/004; A63B 71/0622; A63B 2225/50; A63B 2220/40; A63B 2230/04; A63B 2230/30; A63B 2230/50; A63B 2230/65; H04W 4/023; G08B 5/38; G08B 5/36; G08B 6/00
See application file for complete search history.

(56) References Cited

U.S. PATENT DOCUMENTS 5,921,674 A    7/1999    Koczi
5,930,741 A    7/1999    Kramer
(Continued)

FOREIGN PATENT DOCUMENTS

WO    2015051813    4/2015

OTHER PUBLICATIONS

Xylobands USA. "LED Wristbands," retrieved from the Internet at https://Xylobandsusa.com/led-wristbands/on Feb. 18, 2021.

*Primary Examiner* — Adnan Aziz

(57) ABSTRACT

An example disclosed method of receiving first blink data from a first tag, the first tag carried by a wearable location device associated with a monitored individual having a restricted region; determining tag location data based on the first blink data, the tag location data indicative of the monitored individual locations of the monitored individuals; determining if the monitored individual location is within the restricted region; and when the monitored individual location is within the restricted region: identifying a second tag associated with a security person in proximity to the monitored individual location; alerting the security personnel via the second tag as to the monitored individual being located in the restricted region.

18 Claims, 15 Drawing Sheets

(51) Int. Cl.
*A42B 3/04* (2006.01)
*G08B 5/36* (2006.01)
*A41D 1/00* (2018.01)
*A42B 3/30* (2006.01)
*A63B 43/00* (2006.01)
*A63B 71/06* (2006.01)
*G08B 6/00* (2006.01)
*A41D 27/08* (2006.01)

(52) U.S. Cl.
CPC ........ *A63B 43/004* (2013.01); *A63B 71/0622* (2013.01); *G08B 5/36* (2013.01); *H04W 4/023* (2013.01); *A41D 27/085* (2013.01); *A63B 2220/40* (2013.01); *A63B 2225/50* (2013.01); *A63B 2230/04* (2013.01); *A63B 2230/30* (2013.01); *A63B 2230/40* (2013.01); *A63B 2230/50* (2013.01); *A63B 2230/65* (2013.01); *G08B 6/00* (2013.01)

(56) References Cited

U.S. PATENT DOCUMENTS

| | | |
|---|---|---|
| 6,710,713 B1 | 3/2004 | Russo |
| 6,882,315 B2 | 4/2005 | Richley et al. |
| 7,052,154 B2 | 5/2006 | Vanderschuit |
| 7,323,991 B1 * | 1/2008 | Eckert ............... G07C 9/28 340/572.1 |
| 8,049,688 B2 | 1/2011 | Yu et al. |
| 8,279,051 B2 | 10/2012 | Khan |
| 8,289,185 B2 | 10/2012 | Alonso |
| 8,842,002 B2 | 9/2014 | Rado |
| 9,318,043 B2 | 4/2016 | Chang |
| 10,210,719 B1 * | 2/2019 | Roberts ............... G08B 27/005 |
| 2001/0000958 A1 * | 5/2001 | Ulrich ............... G06K 17/0022 340/539.13 |
| 2002/0186135 A1 * | 12/2002 | Wagner ............... G08B 21/0202 340/573.1 |
| 2003/0090387 A1 | 5/2003 | Lestienne et al. |
| 2003/0128100 A1 | 7/2003 | Burkhardt et al. |
| 2004/0263494 A1 | 12/2004 | Poor et al. |
| 2005/0207817 A1 | 9/2005 | Sarnoff |
| 2005/0275513 A1 * | 12/2005 | Grisham ............... G08G 1/161 340/435 |
| 2006/0267770 A1 * | 11/2006 | Sanari ............... G08B 13/19645 340/572.1 |
| 2008/0252456 A1 * | 10/2008 | Tjebben ............ H01L 21/32139 340/572.1 |
| 2008/0269016 A1 | 10/2008 | Ungari et al. |
| 2009/0048044 A1 | 2/2009 | Oleson et al. |
| 2010/0052864 A1 | 3/2010 | Boyer |
| 2010/0080163 A1 | 4/2010 | Krishnamoorthi et al. |
| 2012/0139708 A1 | 6/2012 | Paradiso et al. |
| 2012/0212505 A1 | 8/2012 | Burroughs et al. |
| 2013/0041590 A1 | 2/2013 | Burich et al. |
| 2013/0066448 A1 | 3/2013 | Alonso |
| 2013/0096704 A1 | 4/2013 | Case, Jr. |
| 2013/0328502 A1 | 12/2013 | Hovey et al. |
| 2014/0184386 A1 * | 7/2014 | Regler ............... H05B 47/155 340/7.61 |
| 2014/0221137 A1 | 8/2014 | Krysiak et al. |
| 2014/0222177 A1 | 8/2014 | Thurman et al. |
| 2015/0149250 A1 * | 5/2015 | Fein ............... G06Q 10/10 705/7.31 |
| 2015/0149837 A1 * | 5/2015 | Alonso ............... G07F 17/32 714/57 |
| 2015/0350233 A1 * | 12/2015 | Baxley ............... H04L 63/302 726/1 |
| 2016/0247378 A1 * | 8/2016 | Baczuk ............... H04W 4/80 |
| 2017/0124836 A1 * | 5/2017 | Chung ............... H04B 7/14 |
| 2017/0180954 A1 | 6/2017 | McHugh |
| 2017/0309147 A1 * | 10/2017 | Kido ............... H05B 45/20 |
| 2017/0321923 A1 * | 11/2017 | Wiens-Kind ......... G05B 19/042 |
| 2018/0049287 A1 | 2/2018 | Lu et al. |
| 2020/0186754 A1 * | 6/2020 | Oki ............... H04N 7/181 |

\* cited by examiner

METHODS, SYSTEMS, AND APPARATUS FOR BI-DIRECTIONAL COMMUNICATION WITH WEARABLE LOCATION DEVICES

RELATED APPLICATION

This patent arises from a continuation of U.S. patent application Ser. No. 15/810,643, filed on Nov. 13, 2017, which is hereby incorporated herein by reference.

FIELD OF THE DISCLOSURE

Embodiments discussed herein are related to radio frequency locating and, more particularly, to systems, methods, and apparatus for bi-directional communication with wearable location devices.

BACKGROUND

Events such as concerts, sporting events, conventions, and the like draw large numbers of fans, consumers, guests, patrons, or convention participants. Such individuals are often subjected to long waits in lines to purchase merchandise, use event facilities, and utilize event services. Additionally, locating persons, facilities and services within a crowded environment such as a concert, sporting event, convention, or the like may be very difficult.

DETAILED DESCRIPTION

Overview

Figure 1A:
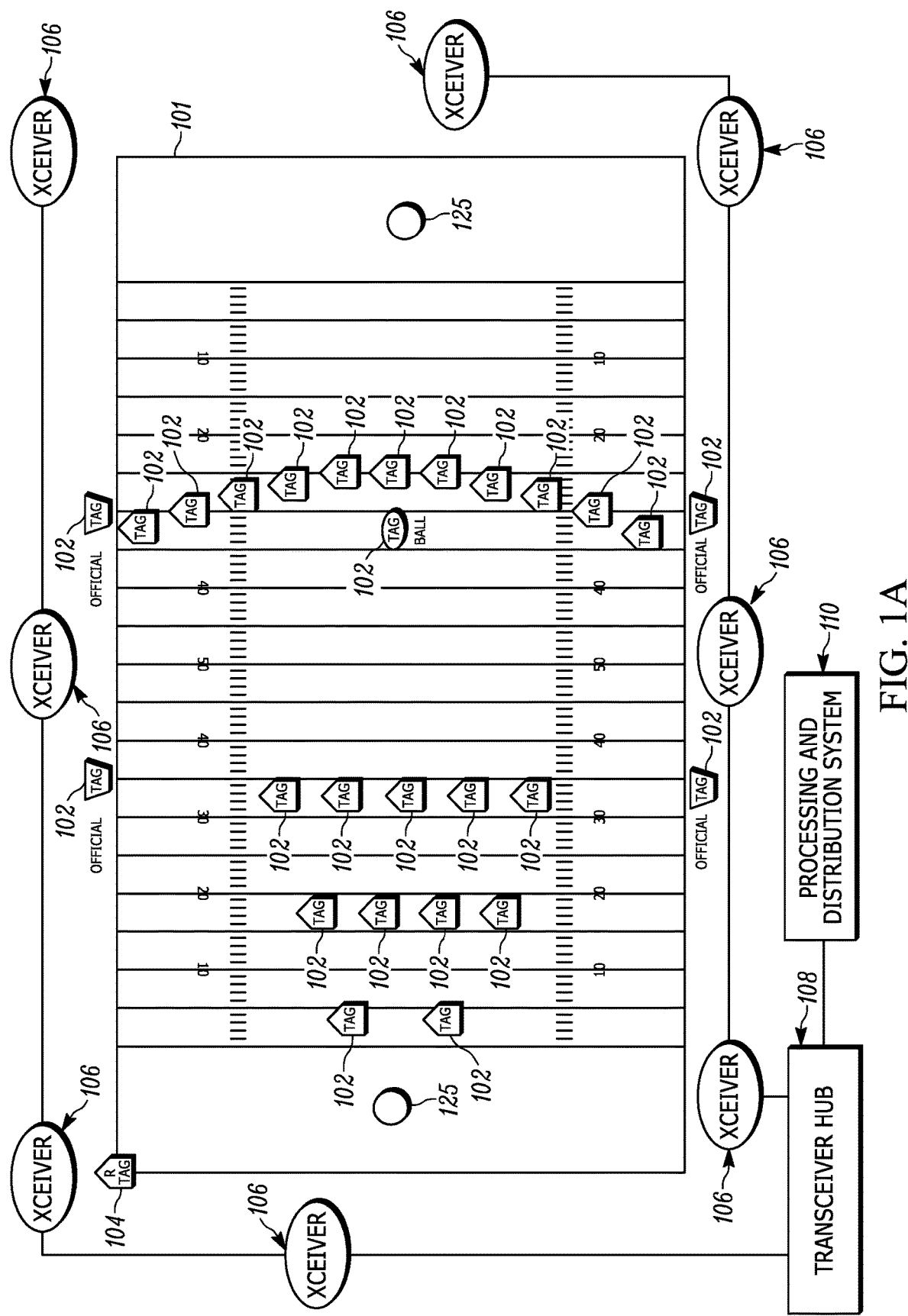
FIGS. 1A and 1B illustrate example environments using a radio frequency locating system for providing location-based applications in accordance with teachings of this disclosure.

Existing location systems are directed, in part, to monitoring and analyzing locations, movement patterns, and other parameters associated with, for example, monitored individuals at an event such as a sporting event, concert, convention, trade show, or other gathering of large numbers of individuals. As used herein, the term "monitored individual" refers to an individual (e.g., patron, participant, provider employee, venue employee, animal and athlete) or object (e.g., machine (e.g., race car), ball, and microphone) equipped to carry location tag(s) and/or sensor(s) as described in detail below. As used herein the term "patron" refers to an individual patronizing an event and/or a venue such as, for example, a consumer, a sporting event fan, a guest, and a trade show and/or convention attendee. As used herein, the term "participant" refers to a person or object having a role in an occurrence taking place at a venue such as, for example, a performer, a player, an official, a game related object such as a ball, a penalty marker, a line of scrimmage and yard to gain markers, and a machine (e.g., race car).

As used herein, the term "venue" refers to a setting that is adapted to host an event such as, for example, a building, a stadium, a convention center, a concert hall, or a locale that is adapted to host a sporting event, concert, convention, trade show, or other gathering of large numbers of individuals. As used herein, the term "venue employee" refers to an agent of the venue such as, for example, a non-merchant employee, a contractor, a ticketing service employee, a security service employee, a maintenance (e.g., custodial, repair, HVAC, etc.) employee, a hospitality (e.g., luxury box services, VIP services, tailgate parties, etc.) employee, a press or media service (e.g., reporters, photographers, social media, etc.) employee, a team support service (e.g., scouting, HR, player safety, etc.) employee, a logistics and delivery employee, an entertainment service employee, a weather information service employee, and a parking service employee. As used herein, the term "merchant" refers to any vendor, provider, or retailer that is positioned at the venue to service patrons. As used herein, the term "mobile merchant" refers to merchants, or merchant employees, that are adapted to move around the venue among the patrons to offer goods or services.

Traditionally, patrons watching or attending the event are not monitored for location data. As a result, patrons may experience long waits in lines for various services, merchants, or facilities throughout the venue detracting from the value and enjoyment of the event.

In example methods and systems disclosed herein, patrons are provided one or more wearable location devices capable of bi-directional communication to wear while at the venue. In some examples described herein, the wearable location device is a location tag in the form of a wristband worn on the wrist of the monitored individual. As described in detail below, by having monitored individuals wear the locatable wristband on the premises of the venue, a location of the monitored individual may be determined and monitored to enhance a patron experience by, for example, communicating bi-directionally with the wristband.

In some examples disclosed herein, the wearable location device includes a communication interface to receive instructions from, for example, a remote server. In some examples disclosed herein, the wearable location device includes one or more light emitting diodes (LEDs) or a display band capable of being programmed to emit light of a particular color and at a particular brightness. In some examples disclosed herein, a location system generates and transmits instructions to a plurality of wearable location devices in the venue such that a composite effect of the light emitted from the wearable location devices in a particular area of the venue is a desired image. For example, the image may be a team logo, an advertisement, information relating to the sporting event, a video, or any other image. Examples disclosed herein utilize the location information provided via the wearable location devices to determine, for example, the particular color and/or brightness to be emitted by the corresponding wearable location device.

In some examples disclosed herein, the location system includes one or more sensors deployed at venue entryways to identify monitored individuals associated with the wearable location devices as the monitored individuals enter the venue. For example, the location system may have an exciter to cause a tag of the wearable location device to commence transmission or the location system may use the sensor data to commence monitoring of the wearable location device. In some examples, the location system determines the route the wearable location device travels throughout the venue. The route may include the rate of travel, proximate locations of facilities, merchants, or other individuals that the monitored individual may have interacted with and/or transaction data associated with the monitored individual. The route data may be used to determine the flow of individuals throughout the venue for placement of advertisements, and merchants, high congestion areas or wait times for services or facilities. Additionally, the route data may be used to identify and change individual behavior. For example, the time the monitored individual enters the venue and leaves may be associated with points, coming early and staying for the full event may earn more points, and lower congestion in specific venue areas. Additionally or alternatively, transactions occurring within a period that has lower sales may earn more points that transactions during peak times, cause the individuals to experience shorter lines and equalize sales volumes over the event.

In examples disclosed herein, the location system sends experience enhancement data to a wearable location device of a monitored individual based on, for example, the location of the monitored individual, route data, historical route data, and/or transaction confirmation history. The location system may determine that the monitored individual is near or in route to a facility or merchant, such as a restroom or concession stand with long wait times, and send a message containing directions to an alternate restroom or merchant. In some examples, the monitored individual can indicate, via the wearable location device, an intent to head towards the facility or merchant. In examples disclosed herein, an output (e.g., a display) of the wearable location device indicates a section of the venue having lower wait times and/or a direction (e.g., via an arrow or other navigation indicator) guiding the monitored individual to the facility having lower wait times.

Locating persons, facilities, or services in a crowded venue may be very difficult. Triangulation positioning systems, such as GPS, on an application device, such as a smart phone, may not be functional indoors, and/or have limited accuracy. Describing location to individuals using land marks may also prove problematic due to limited cellular coverage, or poor directions or descriptions.

Similarly, in examples disclosed herein, a monitored individual can utilize the wearable location device to select and transmit a service request. For example, the monitored individual requests that a particular mobile merchant, first aid assistance, a security guard, or another patron comes to a current location of the requesting monitored individual. In examples disclosed herein, the location system responds by sending a notification to a wearable location device or other device associated with an individual having a role that matches the requested service. In examples disclosed herein, the notification may include the location data for the requesting monitored individual.

Embodiments disclosed herein are illustrated in the appended figures and description below in relation to the sport of American football. However, as will be apparent to one of ordinary skill in the art in view of this disclosure, the inventive concepts herein disclosed are not limited to American football and may be applied to various other applications including, without limitation, other sports or group events such as baseball, basketball, golf, hockey, soccer, racing or motorsports, competitive events, concerts, conventions, and the like.

Example RF Locating System

FIGS. 1A-1B, 2A-2D, 4, and 5 depict, for illustration purposes, various monitored individuals (such as patrons, participants, merchants, equipment, etc.) at a sporting event (i.e., American football). However, as will be apparent to one of ordinary skill in the art, the concepts described herein described are not limited to monitored individuals at sporting events and may be applied to other monitored individuals that may be present at any venue of interest.

Figure 1B:
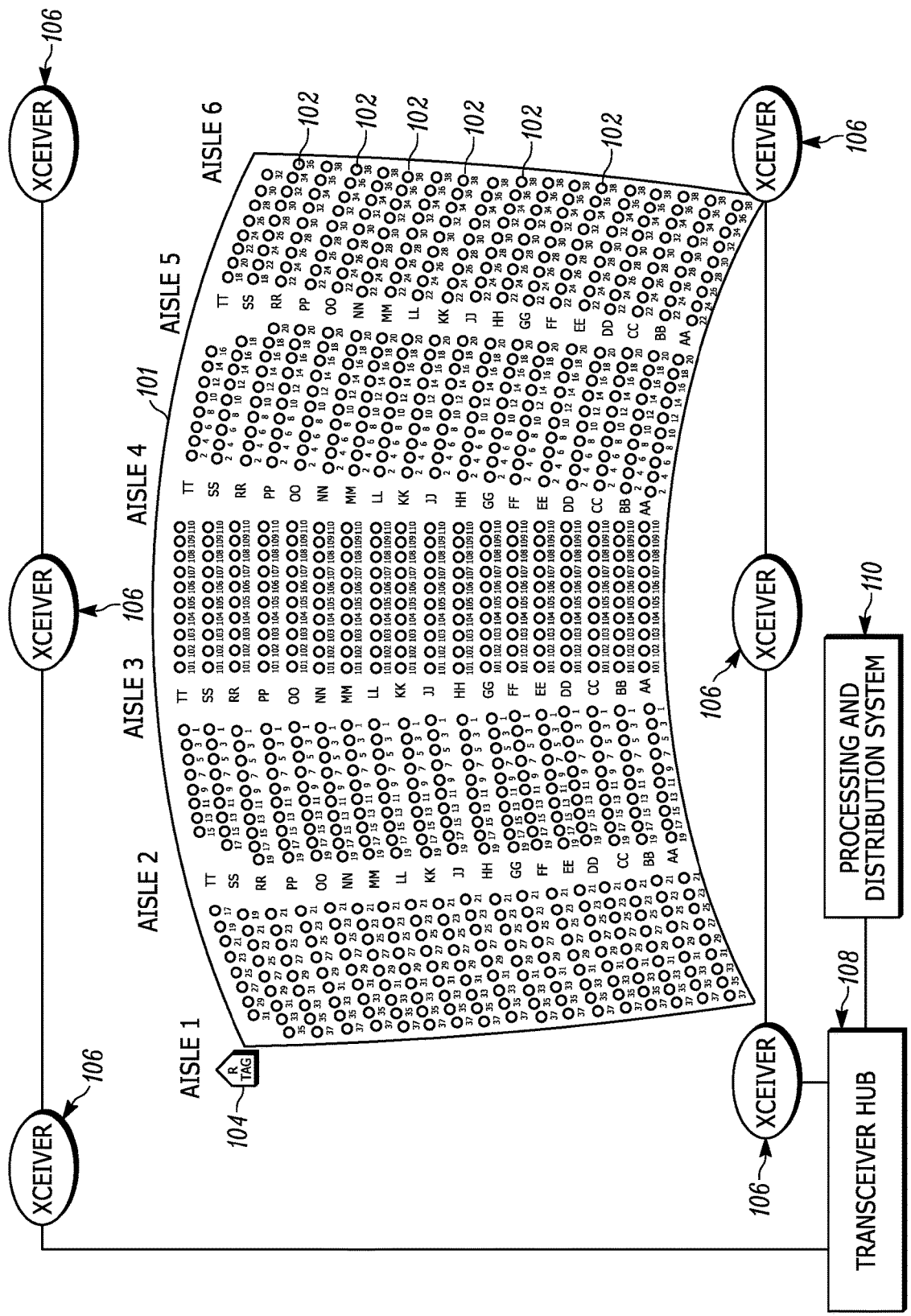

FIGS. 1A and 1B illustrate an exemplary locationing system 100 for supporting location-based monitoring of individuals. The locationing system 100 may calculate a location by an accumulation of position data or time of arrivals (TOAs) at a transceiver hub 108, whereby the TOAs represent a relative time of flight (TOF) from location tags 102 as recorded at each transceiver 106. The location tags 102 are sometimes referred to herein as RTLS tags. The transceivers 106 include radio frequency identification (RFID) receivers configured to receive signals from the RTLS tags 102. The transceivers 106 include Wi-Fi, LTE, or other type of transmitters to communicate instructions or other types of data packets to the RTLS tags 102. As described in detail below, at least some of the RTLS tags 102 are implemented (e.g., housed) in a wearable location device such as a locationing wristband having one or more output devices. Accordingly, the transceiver 106 may include a particular antenna that functions as a transceiver, or a collection of antennas, at least one of which is configured to receive signals and at least one of which is configured to transmit signals. For example, a transceiver may include a receiver to sense RFID signals transmitted by the RTLS tags 102 embedded in locationing wristbands and a transmitter to emit instructions to the locationing wristbands using a same or different communication protocol and/or frequency.

In the example of FIG. 1, a timing reference clock is used such that at least a subset of the transceivers 106 may be synchronized in frequency, whereby the relative TOA data associated with each of the RTLS tags 102 can be registered by a counter associated with at least a subset of the transceivers 106. In some examples, a reference tag 104, such as a UWB transmitter, positioned at known coordinates, is used to determine a phase offset between the counters associated with at least a subset of the of the transceivers 106. The RTLS tags 102 and the reference tags 104 may reside in a monitored area. The systems described herein may be referred to as either "multilateration" or "geolocation" systems, terms that refer to the process of locating a signal source by solving an error minimization function of a location estimate determined by the difference in time of arrival (DTOA) between TOA signals received at multiple transceivers 106.

In some examples, the locationing system 100 is configured to provide two dimensional and/or three-dimensional precision localization (e.g., subfoot resolutions), even in the presence of multipath interference, due in part to the use of short nanosecond duration pulses whose TOF can be accurately determined using detection circuitry, such as in the transceivers 106, which can trigger on the leading edge of a received waveform. In some examples, this short pulse characteristic allows necessary data to be conveyed by the system at a higher peak power, but lower average power levels, than a wireless system configured for high data rate communications, yet still operate within local regulatory requirements.

In some examples, to provide a particular performance level while complying with the overlap of regulatory restrictions (e.g. FCC and ETSI regulations), the RTLS tags 102 operate with an instantaneous −3 dB bandwidth of approximately 400 MHz and an average transmission below 187 pulses in a 1 msec interval, provided that the packet rate is sufficiently low. In such examples, the predicted maximum range of the system, operating with a center frequency of 6.55 GHz, is roughly 200 meters in instances in which a 12 dB bi-directional antenna is used at the receiver, but the projected range may depend, in other examples, upon receiver antenna gain. Alternatively or additionally, the range of the system allows for one or more of the RTLS tags 102 to be detected with one or more of the transceivers 106 positioned throughout the venue. Such a configuration advantageously satisfies constraints applied by regulatory bodies related to peak and average power densities (e.g., effective isotropic radiated power density ("EIRP")), while still optimizing system performance related to range and interference. In further examples, tag transmissions with a −3 dB bandwidth of approximately 400 MHz yields an instantaneous pulse width of roughly 2 nanoseconds that enables a location resolution to better than 30 centimeters.

Referring again to FIGS. 1A and 1B, the RTLS tags 102 have a UWB transmitter that transmits a burst (e.g., multiple pulses at a 1 Mb/s burst rate, such as 112 bits of On-Off keying (OOK) at a rate of 1 Mb/s), and optionally, a burst comprising an information packet utilizing OOK that may include, but is not limited to, ID information, a sequential burst count or other desired information for object or personnel identification, inventory control, etc. In some examples, the sequential burst count (e.g., a packet sequence number) from each of the RTLS tags 102 is advantageously provided to permit, at the transceiver hub 108, correlation of TOA measurement data from the various transceivers 106.

In some examples, the RTLS tag 102 employs UWB waveforms (e.g., low data rate waveforms) to achieve extremely fine resolution because of their extremely short pulse (i.e., sub-nanosecond to nanosecond, such as a 2 nsec (1 nsec up and 1 nsec down)) durations. As such, the information packet may be of a short length (e.g. 112 bits of OOK at a rate of 1 Mb/sec, in some example embodiments), that advantageously enables a higher packet rate. If each information packet is unique, a higher packet rate results in a higher data rate; if each information packet is transmitted repeatedly, the higher packet rate results in a higher packet repetition rate. In some examples, higher packet repetition rate (e.g., 12 Hz) and/or higher data rates (e.g., 1 Mb/sec, 2 Mb/sec or the like) for each tag 102 results in larger datasets for filtering to achieve a more accurate location estimate. Alternatively or additionally, in some examples, the shorter length of the information packets, in conjunction with other packet rate, data rates and other system requirements, may also result in a longer battery life (e.g., 7 years battery life at a transmission rate of 1 Hz with a 300 mAh cell.

Tag signals may be received at the transceiver 106 directly from the RTLS tags 102, or may be received after being reflected en route. Reflected signals travel a longer path from the RTLS tag 102 to the transceiver 106 than would a direct signal, and are thus received later than the corresponding direct signal. This delay is known as an echo delay or multipath delay. If reflected signals are sufficiently strong enough to be detected by the transceiver 106, they can corrupt a data transmission through inter-symbol interference. In some examples, the RTLS tag 102 employs UWB waveforms and short information packets to achieve extremely fine resolution and enable packet durations to be brief (e.g. 112 microsec) while allowing inter-pulse times (e.g., 998 nsec) sufficiently longer than expected echo delays, thereby avoiding data corruption.

Reflected signals may be expected to become weaker as delay increases due to more reflections and the longer distances traveled. Thus, beyond some value of inter-pulse time (e.g., 998 nsec), corresponding to some path length difference (e.g., 299.4 m.), there may be no advantage to further increases in inter-pulse time (and, hence lowering of burst data rate) for any given level of transmit power. In this manner, minimization of packet duration may extend the battery life of a tag, as its digital circuitry need only be active for a brief time. As venues or regions of venues can have different expected echo delays, different burst data rates and, hence, packet durations, may be appropriate in different situations depending on the venue or the region of the venue.

Minimization of the packet duration also enables the RTLS tag 102 to transmit more packets in a given time period, although in practice, regulatory average EIRP limits may often provide an overriding constraint. However, brief packet duration also reduces the likelihood of packets from multiple RTLS tags 102 overlapping in time, causing a data collision. Thus, minimal packet duration enables multiple RTLS tags 102 to transmit a higher aggregate number of packets per second, increasing the number of RTLS tags 102 that may be tracked, or an increase the rate at which a fixed number of RTLS tags 102 are tracked.

The high burst data transmission rate (e.g., 1 MHz), coupled with the short data packet length (e.g., 112 bits) and the relatively low repetition rates (e.g., 1 TX/sec), provide for at least two distinct advantages, in some examples: (1) a greater number of RTLS tags 102 may transmit independently with a lower collision probability, and/or (2) each independent tag transmit power may be increased, with proper consideration given to a battery life constraint, such that a total energy for a single data packet is less than a regulated average power for a given time interval (e.g., a 1 msec time interval for an FCC regulated transmission).

Alternatively or additionally, additional sensor or telemetry data may be transmitted from the RTLS tag 102 to provide the transceivers 106 with information about the environment and/or operating conditions of the RTLS tag 102. For example, the RTLS tag 102 transmits a temperature to the transceivers 106. Such information may be valuable, for example, in a system involving perishable goods or other refrigerant requirements, such as those carried by a mobile merchant food vendor. In this example embodiment, the temperature may be transmitted by the RTLS tag 102 at a lower repetition rate than that of the rest of the data packet. For example, the temperature may be transmitted from the RTLS tag 102 to the transceivers 106 at a rate of one time per minute (e.g., 1 TX/min.), or in some examples, once every 720 times the data packet is transmitted, whereby the data packet in this example is transmitted at an example rate of 12 TX/sec.

Alternatively or additionally, the RTLS tag 102 may be programmed to intermittently transmit data to the transceivers 106 in response to a signal from a magnetic command transmitter (not shown). The magnetic command transmitter may be a portable device, functioning to transmit a 125 kHz signal, in some example embodiments, with a range of approximately 15 feet or less, to one or more of the RTLS tags 102. In some examples, the RTLS tags 102 are equipped with at least a receiver tuned to the magnetic command transmitter transmit frequency (e.g., 125 kHz) and functional antenna to facilitate reception and decoding of the signal transmitted by the magnetic command transmitter.

In some examples, one or more other tags, such as the reference tag 104, are positioned within and/or about a monitored region. In some examples, the reference tag 104 may be configured to transmit a signal that is used to measure the relative phase (e.g., the count of free-running counters) of non-resettable counters within the transceivers 106.

The transceivers 106 are positioned at predetermined coordinates within and/or around the monitored area 101. In some examples, the transceivers 106 are connected in a "daisy chain" fashion to advantageously allow for a large number of the transceivers 106 to be interconnected to reduce and simplify cabling, provide power, and/or the like. Each of the transceivers 106 includes a receiver for receiving transmissions, such as UWB transmissions, and a packet decoding circuit that extracts a time of arrival (TOA) timing pulse train, transmitter ID, packet number, and/or other information that may have been encoded in the tag transmission signal (e.g., material description, personnel information, etc.) and is configured to sense signals transmitted by the RTLS tags 102 and the reference tag 104. Additionally, each of the transceivers 106 includes a transmitter for transmitting, for example, instructions to wearable location devices in which the RTLS tags 102 are housed.

As shown in the example system illustrated in FIG. 1A, the transceivers 106 surround a field of play. Accordingly, the monitored area 101 for the illustrated example transceivers 106 includes, for example, the participants of the sporting event. Additionally or alternatively, as shown in the example system illustrated in FIG. 1B, several daisy chains of transceivers 106 surround a viewing area (e.g., seating) of the venue. Accordingly, the monitored area 101 for the illustrated example 106 includes a plurality of patrons and any mobile merchants that happen to be in the viewing area.

Each of the transceivers 106 includes a time measuring circuit that measures times of arrival (TOA) of tag bursts, with respect to its internal counter. The time measuring circuit may be phase-locked (e.g., phase differences do not change and therefore respective frequencies are identical) with a common digital reference clock signal distributed via cable connection from the transceiver hub 108 having a central timing reference clock generator. The reference clock signal may establish a common timing reference for the transceivers 106. Thus, multiple time measuring circuits of the respective transceivers 106 may be synchronized in frequency, but not necessarily in phase. While there typically may be a phase offset between any given pair of transceivers 106, the phase offset may be readily determined through use of the reference tag 104. Alternatively or additionally, each of the transceivers 106 is synchronized wirelessly via virtual synchronization without a dedicated physical timing channel.

In some example embodiments, the transceivers 106 are configured to determine various attributes of the received signal. Because measurements may be determined at each of the transceivers 106, in a digital format, rather than analog in some examples, signals may be transmittable to the transceiver hub 108. Advantageously, because packet data and measurement results may be transferred at high speeds to a transceiver memory, the transceivers 106 may receive and process tag (and corresponding object) locating signals on a nearly continuous basis. As such, in some examples, the transceiver memory allows for a high burst rate of tag events (i.e., information packets) to be captured.

Data cables or wireless transmissions may convey measurement data from the transceivers 106 to the transceiver hub 108 (e.g., the data cables may enable a transfer speed of 2 Mbps). In some examples, measurement data is transferred to the transceiver hub 108 at regular polling intervals.

As such, the transceiver hub 108 determines or otherwise computes tag location by processing TOA measurements relative to multiple data packets detected by the transceivers 106. In some examples, the transceiver hub 108 is configured to resolve the coordinates of the RTLS tags 102 using nonlinear optimization techniques.

In some examples, TOA measurements from multiple ones of the transceivers 106 are processed by the transceiver hub 108 to determine a location of the RTLS tags 102 by a differential time-of-arrival (DTOA) analysis of the multiple TOAs. The DTOA analysis includes a determination of tag transmit time to, whereby a time-of-flight (TOF), measured as the time elapsed from the estimated tag transmit time $t_0$ to the respective TOA, represents graphically the radii of spheres centered at respective transceivers 106. The distance between the surfaces of the respective spheres to the estimated position coordinates ($x_0$, $y_0$, $z_0$) of the RTLS tag 102 represents the measurement error for each respective TOA, and the minimization of the sum of the squares of the TOA measurement errors from each receiver participating in the DTOA position estimate provides for both the position coordinates ($x_0$, $y_0$, $z_0$) of the RTLS tag 102 and of that RTLS tag's 102 transmit time to.

In some examples, the system is referred to as an "over-specified" or "over-determined" system. As such, the transceiver hub 108 calculates one or more valid (i.e., most correct) locations based on a set of measurements and/or one or more incorrect (i.e., less correct) locations. For example, a location may be calculated that is impossible due the laws of physics or may be an outlier when compared to other calculated positions. As such one or more algorithms or heuristics may be applied to minimize such error.

The starting point for the minimization may be obtained by first doing an area search on a coarse grid of x, y and z over an area defined by the user and followed by a localized steepest descent search. The starting position for this algorithm is fixed, in some examples, at the mean position of all active transceivers 106. No initial area search may be needed, and optimization may proceed through the use of a Davidon-Fletcher-Powell (DFP) quasi-Newton algorithm in some examples. In other examples, a steepest descent algorithm may be used.

One such algorithm for error minimization, which may be referred to as a time error minimization algorithm, may be described in Equation 1:

$$\varepsilon = \Sigma_{j=1}^{N}[[(x-x_j)^2+(y-y_j)^2+(z-z_j)^2]^{1/2}-c(t_j-t_0)]^2 \quad (1)$$

Where N is the number of transceivers, c is the speed of light, $(x_j, y_j, z_j)$ are the coordinates of the $j^{th}$ transceiver, $t_j$ is the arrival time at the $j^{th}$ transceiver, and to is the tag transmit time. The variable $t_0$ represents the time of transmission. Because $t_0$ is not initially known, the arrival times, $t_j$, as well as $t_0$, may be related to a common time base, which in some examples, is derived from the arrival times. As a result, differences between the various arrival times may have significance for determining position as well as $t_0$.

The optimization algorithm to minimize the error ε in Equation 1 may be the Davidon-Fletcher-Powell (DFP) quasi-Newton algorithm, for example. In some examples, the optimization algorithm to minimize the ε in Equation 1 may be a steepest descent algorithm. In each case, the algorithms may be seeded with an initial position estimate (x, y, z) that represents the two-dimensional (2D) or three-dimensional (3D) mean of the positions of the transceivers 106 that participate in the tag position determination.

In some examples, the locationing system 100 comprises a transceiver grid, whereby each of the transceivers 106 in the transceiver grid keeps a transceiver clock that is synchronized, with an initially unknown phase offset, to the other transceiver clocks. The phase offset between any transceiver may be determined by use of the reference tag 104 that is positioned at a known coordinate position $(x_T, y_T, z_T)$. The phase offset serves to resolve the constant offset between counters within the various transceivers 106, as described below.

In further example embodiments, a number N of transceivers 106 $\{R_j: j=1, \ldots, N\}$ are positioned at known coordinates $(x_{Rj}, y_{Rj}, z_{Rj})$, which are respectively located at distances $d_{Rj}$ from the reference tag 104, such as given in Equation 2:

$$d_{Rj} = \sqrt{(x_{Rj}-x_T)^2 + (y_{Rj}-y_T)^2 + (z_{Rj}-z_T)^2} \quad (2)$$

Each transceiver $R_j$ utilizes, for example, a synchronous clock signal derived from a common frequency time base, such as a clock generator. Because the transceivers 106 are not synchronously reset, an unknown, but constant offset $O_j$ exists for each transceiver's internal free running counter. The value of the constant offset $O_j$ may be measured in terms of the number of fine resolution count increments (e.g., a number of nanoseconds for a one nanosecond resolution system).

The reference tag 104 may be used, in some examples, to calibrate the locationing system 100 as follows: The reference tag 104 may emit a signal burst at an unknown time TR. Upon receiving the signal burst from the reference tag 104, a count $N_{Rj}$ as measured at transceiver $R_j$ is given in Equation 3 by:

$$N_{Rj} = \beta\tau_R + O_j + \beta d_{Rj}/c \quad (3)$$

Where c is the speed of light and β is the number of fine resolution count increments per unit time (e.g., one per nanosecond). Similarly, each object tag $T_i$ of each object to be located transmits a signal at an unknown time $\tau_i$ to produce a count $N_{ij}$ as given in Equation 4:

$$N_{ij} = \beta\tau_i + O_j + \beta d_{ij}/c \quad (4)$$

at transceiver $R_j$ where $d_{ij}$ the distance between the object tag $T_i$ and the transceiver 106 $R_j$. Note that $\tau_i$ is unknown, but has the same constant value for all transceivers. Based on the equalities expressed above for receivers $R_j$ and $R_k$ and given the reference tag 104 information, phase offsets expressed as differential count values are determined as given in Equations 5a-b:

$$N_{Rj} - N_{Rk} = (O_j - O_k) + \beta\left(\frac{d_{Rj}}{c} - \frac{d_{Rk}}{c}\right) \quad (5a)$$

Or, $$(O_j - O_k) = (N_{Rj} - N_{Rk}) - \beta\left(\frac{d_{Rj}}{c} - \frac{d_{Rk}}{c}\right) = \Delta_{jk} \quad (5b)$$

Where $\Delta_{jk}$ is constant as long as $d_{Rj}-d_{Rk}$ remains constant, (which means the transceivers 106 and reference tag 104 are fixed and there is no multipath situation) and β is the same for each transceiver. Note that $\Delta_{jk}$ is a known quantity, since $N_{Rj}$, $N_{Rk}$, β, $d_{Rj}/c$, and $d_{Rk}/c$ are known. That is, the phase offsets between receivers $R_j$ and $R_k$ may be readily determined based on the reference tag 104 transmissions. Thus, again from the above equations, for a tag 102 $(T_i)$ transmission arriving at transceivers $R_j$ and $R_k$, one may deduce the following Equations 6a-b:

$$N_{ij} - N_{ik} = (O_j - O_k) + \beta\left(\frac{d_{ij}}{c} - \frac{d_{ik}}{c}\right) = \Delta_{jk} + \beta\left(\frac{d_{ij}}{c} - \frac{d_{ik}}{c}\right) \quad (6a)$$

Or, $$d_{ij} - d_{ik} = (c/\beta)[N_{ij} - N_{ik} - \Delta_{jk}] \quad (6b)$$

Each arrival time, $t_j$, can be referenced to a particular transceiver (transceiver "1") as given in Equation 7:

$$t_j = \frac{1}{\beta}(N_j - \Delta_{j1}) \quad (7)$$

The minimization, described in Equation 1, may then be performed over variables (x, y, z, $t_0$) to reach a solution (x', y', z', $t_0$').

In some example embodiments, the location of the RTLS tag 102 is output to a transceiver processing and distribution system 110 for further processing of the location data to advantageously provide visualizations, predictive analytics, statistics and/or other venue experience enhancements.

The exemplary locationing system of FIGS. 1A and 1B may be used in providing performance analytics in accordance with some embodiments disclosed herein. In the example venues of FIGS. 1A and 1B, data may be captured and analyzed, such as during a sporting event to identify event occurrences, statistics, and other data useful to a sports team, league, viewer, licensee, or the like. In some embodiments, data associated with a number of participants (e.g., players, officials, balls, game equipment, etc.) on a monitored area 101 such as playing field, is generated and provided to an analytics system. As such, as further discussed in connection with FIGS. 2A-D below, each monitored individual may carry one or more tags 102 (such as via equipment worn by a player) to be used to track data such as location, change of location, speed, or the like of each monitored individual. In some embodiments, additional sensors, such as, without limitation, accelerometers, magnetometers, time-of-flight sensors, health sensors, temperature sensors, moisture sensors, light sensors, or the like, may be attached to each monitored individual to provide further data to the performance analytics system. Such additional sensors may provide data to the RTLS tag 102, either through a wired or wireless connection, to be transmitted to the transceivers 106 or the sensors may be configured to transmit data to receivers (i.e., sensor receivers) separately from the RTLS tags 102.

One or more of the transceivers 106 may receive transmissions from the RTLS tags 102 and transmit the blink data to the transceiver hub 108. As used herein, the term "blink data" refers to data that includes characteristics of the tag signal that allow the tag signal to be recognized by a receiver (e.g., the transceivers 106) so that the location of the corresponding tag can be determined by the locationing system 100. Blink data may also include one or more tag data packets including data from the tag that is intended for transmission such as, for example, tag data and a tag-individual correlator. In the case of TDOA systems, the blink data may be or include a specific pattern, code, or trigger that the transceiver 106 (or downstream receiver processing and analytics system) detects to identify that the transmission is from an RTLS tag (e.g., a UWB tag). Blink data may include data including a tag unique identifier ("tag UID") to identify a particular location tag.

The transceiver hub 108 processes the received blink data to determine tag location for the RTLS tags 102. The transceiver hub 108 transmits the tag location data to one or more processors, such as the transceiver processing and distribution system 110. The transceiver processing and distribution system 110 uses one or more modules (e.g., processing engines) and one or more databases to identify which monitored individual the RTLS tag 102 is associated with, such as a player, patron, official, ball, or the like.

In some embodiments, multiple RTLS tags 102 (as well as other sensors) may be attached to the equipment (e.g., a wristband) worn by monitored individuals. The transceiver processing and distribution system 110 may use one or more databases to associate the tag identifier (e.g., a tag UID) of each RTLS tag 102 with each monitored individual and correlate the tag location data and/or other tag and sensor derived data for multiple RTLS tags 102 that are associated with a particular monitored individual.

Example Tag/Sensor Positioning and Monitored Individual Correlation

FIG. 1A shows a monitored area 101. The monitored area 101 comprises a plurality of positions at one or more time epochs. The plurality of positions may be divided into one or more regions, called zones. Each zone may be described by one or more coordinate systems, such as a local NED (North-East-Down) system, a latitude-longitude system, or even a yard line system as might be used for an American football game. A location may be a description of a position, or a plurality of positions, within the monitored area 101. For example, a field marker at the intersection of the south goal line and west out of bounds line at Bank of America Stadium in Charlotte, N.C. could be described as {0,0,0} in a local NED system, or 35.225336 N 80.85273 W longitude 751 ft. altitude on a latitude-longitude system, or simply "Panthers Goal Line" in a yard line system. Some example locations may vary throughout the game. For example, offside in soccer may be measured based on the location of the furthest back defender. Accordingly, an "offside location" may vary in size as different participants move across the monitored area 101. Because different types of locationing systems 100 or different zones within a single locationing system 100 may use different coordinate systems, a Geographical Information System or similar monitored area database may be used to associate location data. One type of Geographical Information System describing at least a field of play may be called Field Data.

Figure 2A:
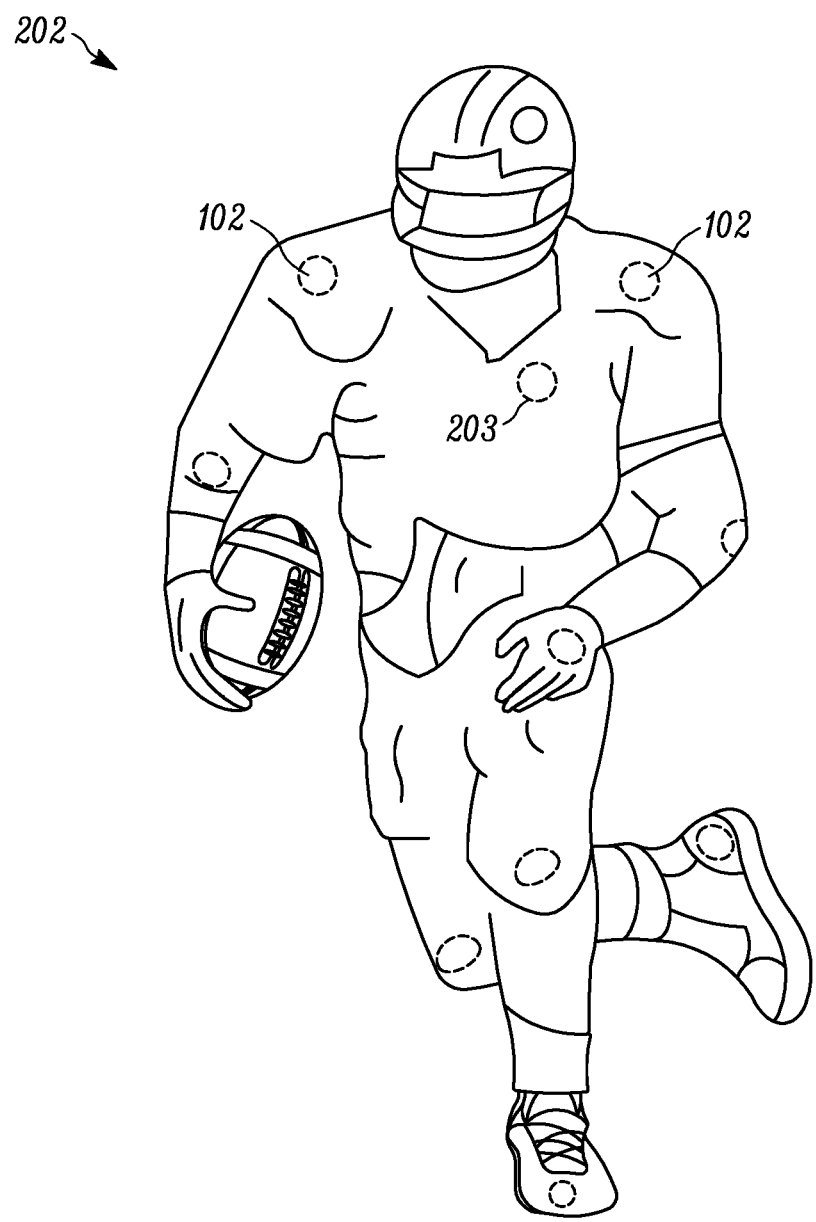
FIGS. 2A-E illustrate example monitored individuals carrying tags and sensors that may provide information to a locationing system and receive instructions from the locationing system.

FIGS. 2A-E illustrate some examples of monitored individuals that provide information to the locationing system 100. FIG. 2A illustrates a player 202 (e.g., a football player) wearing equipment having attached RTLS tags 102. The depicted player 202 is wearing shoulder pads having RTLS tags 102 affixed to opposite sides thereof. This positioning advantageously provides an elevated broadcast position for each RTLS tag 102 thereby increasing its communication effectiveness.

Additional sensors 203 may be attached to equipment worn by the player 202, such as accelerometers, magnetometers, time-of-flight sensors, health monitoring sensors (e.g., blood pressure sensors, heart monitors, respiration sensors, moisture sensors, temperature sensors), light sensors, or the like. The additional sensors 203 are affixed to shoulder pads, the helmet, the shoes, rib pads, elbow pads, the jersey, the pants, a bodysuit undergarment, gloves, arm bands, wristbands, and the like.

The sensors 203 are configured to communicate with receivers (e.g., the transceivers 106 of FIG. 1) directly or indirectly through RTLS tags 102 or other transmitters. For example, in one embodiment, a sensor 203 is connected, wired (e.g., via wires sewn into a jersey or bodysuit undergarment) or wirelessly, to RTLS tags 102 to provide sensor data to the RTLS tags 102, which is then transmitted to the transceivers 106 via the RTLS tags 102. Alternatively, a plurality of sensors (not shown) are connected to a dedicated antenna or transmitter, such as, for example, one positioned in the helmet, which may transmit sensor data to one or more dedicated sensor receivers (not shown).

Figure 2B:
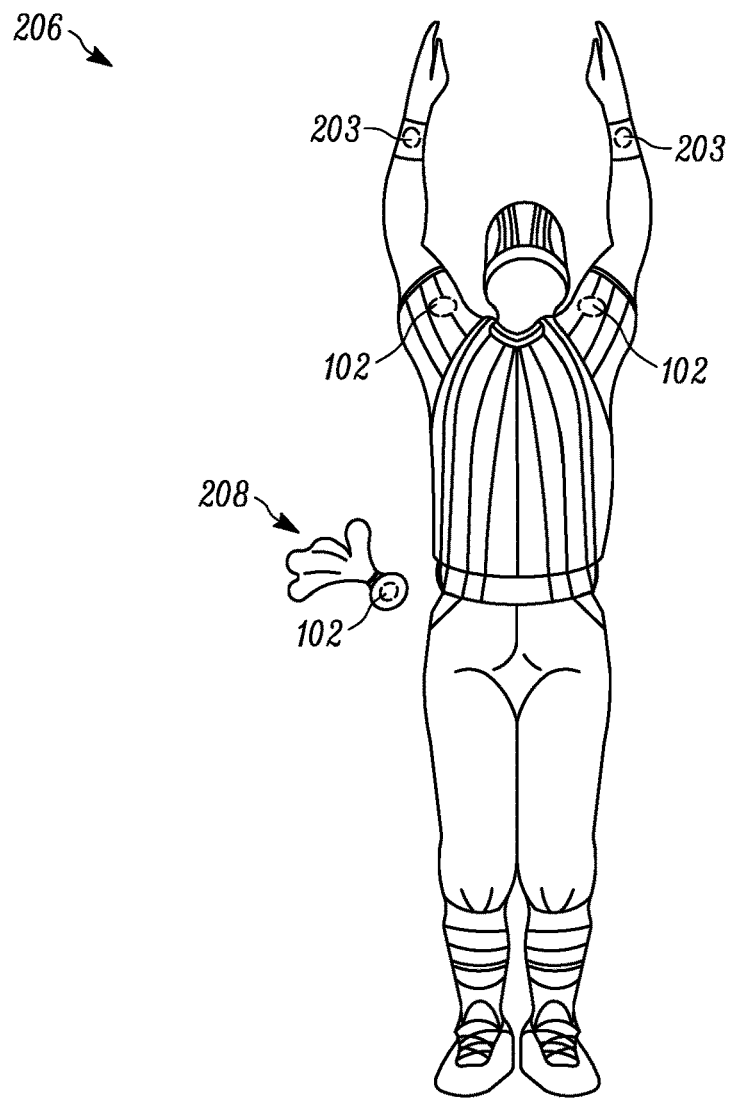

FIG. 2B illustrates a game official 206 wearing equipment having attached RTLS tags 102 and sensors 203 in accordance with some embodiments. In the depicted embodiment, the RTLS tags 102 are attached to the official's jersey proximate opposite shoulders. The sensors 203 are positioned in wristbands worn on the official's wrists as shown. The sensors 203 are configured to communicate with the transceiver 106 directly or indirectly through RTLS tags 102 or other transmitters as discussed above in connection with FIG. 2A.

As discussed in greater detail below, the positioning of sensors 203 (such as accelerometers) proximate the wrists of the official may allow the transceiver processing and distribution system 110 to determine particular motions, movements, or activities of the official 206 for use in determining event occurrences (e.g., winding of the game clock, first down, touchdown, or the like). The official 206 may also carry other equipment, such as penalty flag 208, which may also have an RTLS tag 102 (and optionally one or more sensors) attached to provide additional data to the transceiver processing and distribution system 110. For example, the transceiver processing and distribution system 110 may use tag location data associated with the penalty flag 208 to determine when the official is merely carrying the penalty flag 208 versus when the official is using the penalty flag 208 to indicate an event occurrence, such as a penalty (e.g., by throwing the penalty flag 208).

Figure 2C:
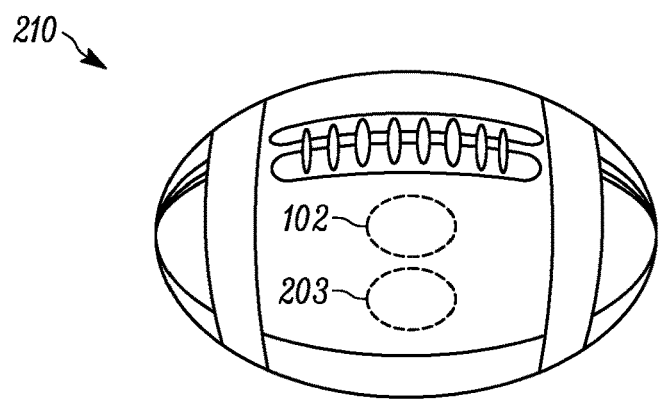

FIG. 2C illustrates an example of a ball 210 having RTLS tags 102 attached or embedded. Additionally, sensors 203 may be attached to or embedded in the ball 210, such as accelerometers, time-of-flight sensors, or the like. In some embodiments, the sensor 203 is connected, wired or wirelessly, to an RTLS tag 102 to provide sensor data to the RTLS tag 102 which is then transmitted to the transceivers 106. In some embodiments, the sensor 203 transmits sensor data to transceivers separately from the RTLS tag 102, such as described above in connection with FIG. 2A.

Figure 2D:
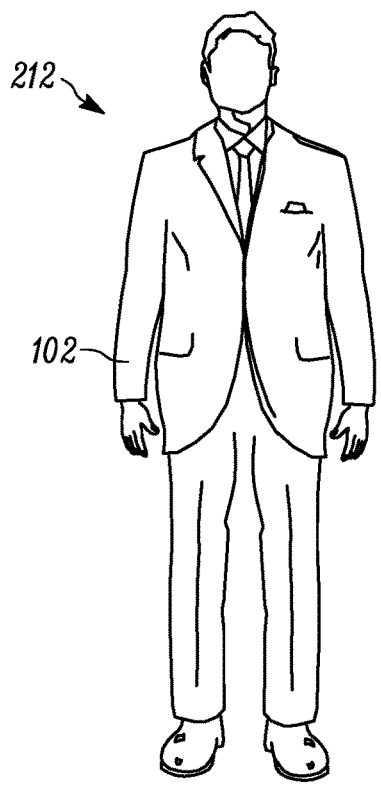
Figure 2E:
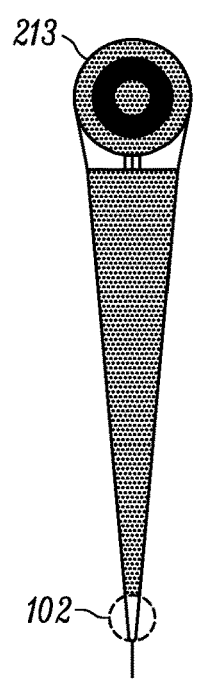

FIG. 2E illustrates an example of a first down marker 213 having RTLS tags 102 attached or embedded. The RTLS tag 102 of the first down marker 213 transmits blink data to the transceivers 106 such that the location of the first down marker can be determined. Accordingly, the processing and distribution system 110 can define a first down threshold based on the location of the first down marker 213.

Figure 2F:
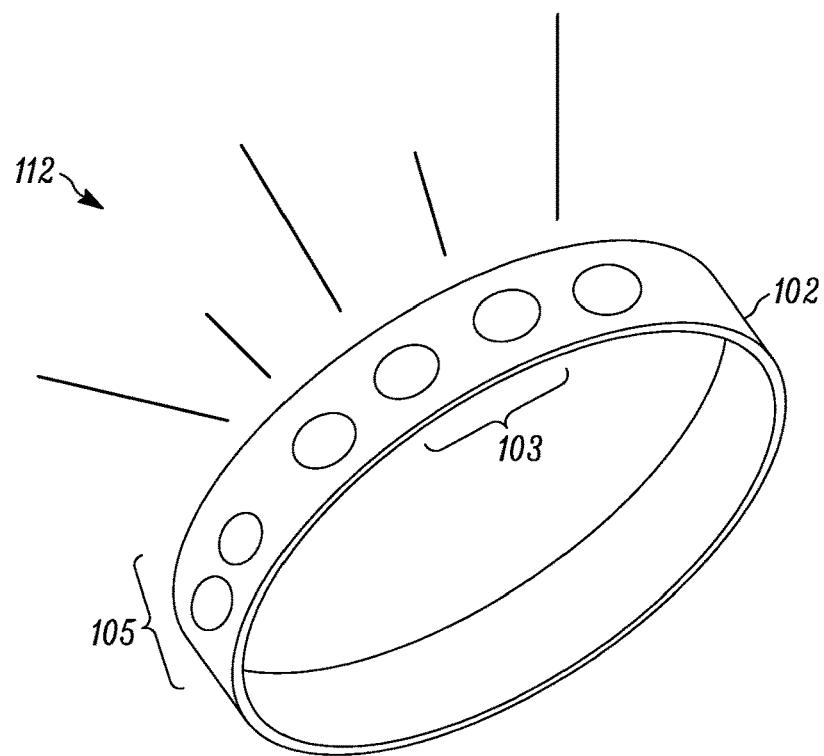
FIGS. 2F and 2G illustrate example wearable location devices that support bi-directional communication in accordance with teachings of this disclosure.
Figure 2G:
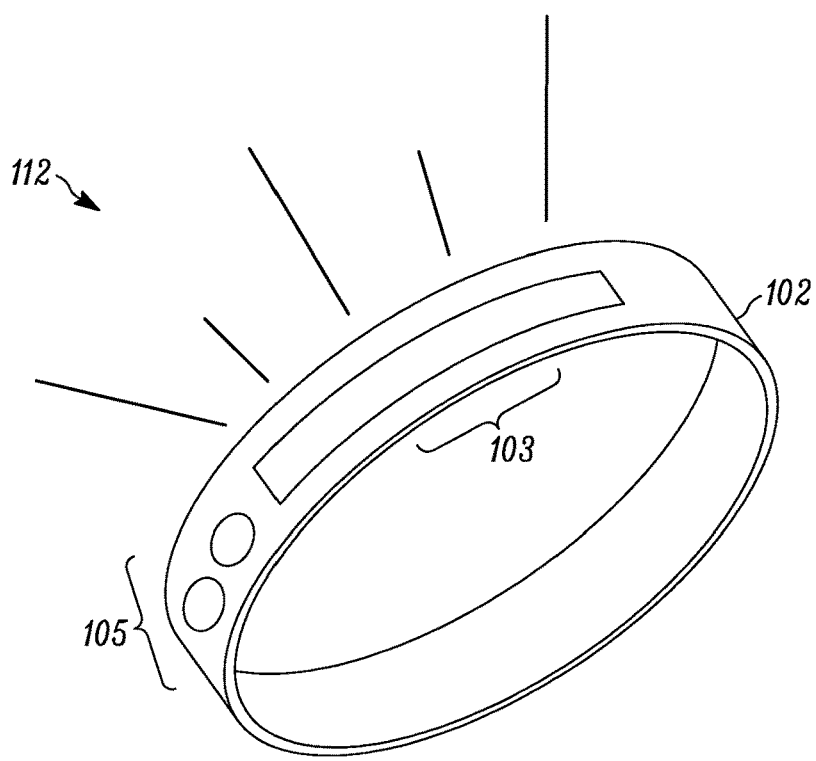

FIG. 2D illustrates an example patron 212 carrying one or more RTLS tags 102 and/or sensors (not shown). The RTLS tag 102 and/or sensors may be embedded in a wearable location device, such as a wristband worn on the patron's wrist. FIGS. 2F and 2G illustrate example wearable location devices 112. In addition to the RTLS tag 102, the example wearable location devices 112 include an optical output 103, such as the LEDs 103 illustrated in the example of FIG. 2F or a display band 103 illustrated in the example of FIG. 2G. Additionally or alternatively, the wearable location device 112 may include a haptic output that causes the wearable location device 112 to vibrate upon, for example, receiving of an instruction. Additionally or alternatively, the wearable location device 112 may include an audio output, such as speakers, and/or support Bluetooth or other types short-range communications to provide received audio data to headphones worn by a monitored individual.

The use of the wearable location device 112 improves the ability for the processing and distribution system 110 to locate and provide feedback to monitored individuals. To this end, while monitored individuals generally carry mobile phones while at a venue, mobile phone networks tend to be congested and unreliable at crowded locations, such as concert halls and stadiums. Accordingly, the disclosed communication techniques enable the processing and distribution system 110 to control timing and formatting (communication protocol and/or frequency) of messages to avoid network congestion. Additionally, the GPS positioning techniques included in most mobile phones are less accurate than the presently disclosed locationing techniques. Thus, systems that rely on mobile phone GPS are less able to precisely assign a color to a wearable location device 112. As a result, the presently disclosed techniques are able to generate higher resolution images than conventionally possible, and are also able to detect (and mitigate) gaps in a displayed image.

In the examples of FIGS. 2F and 2G, the wearable location devices 112 include one or more buttons 105 that enable the monitored individual 212 to send a request to the processing and distribution system 110. For example, the request may indicate that the monitored individual 212 needs emergency services, is attempting to locate a group member, wants to make a purchase from a mobile merchant, is about to visit a facility, and so on. In some examples, the request is included in the blink data (e.g., as an element of a data packet) the RFID tag 102 sends to the transceivers 106. Additionally or alternatively, the request is communicated to the transceiver processing and distribution system 110 via a different communication channel (e.g., a private Wi-Fi or LTE network) than the channel utilized by the RTLS tag 102 and/or by the sensors 203. As described in detail below, the example wearable location devices 112 are configured to receive instructions from, for example, the transceiver processing and distribution system 110 via this different communication channel.

The RTLS tags 102 and the sensors 203 of FIGS. 2A-E are correlated to the corresponding monitored individuals. For example, in some embodiments, unique tag or sensor identifiers ("unique IDs") are correlated to a participant profile (e.g., John Smith—running back, Fred Johnson—line judge official, or ID 027—one of several game balls, Mike Smith—Beer salesmen sections 200-218, Julia Williams—member of fan group X12AB, etc.) and stored to a remote database accessible to the transceiver processing and distribution system 110 as discussed in greater detail below. In some embodiments, unique tag or sensor identifiers may be correlated to a patron profile (e.g., Frank Williams—season ticket holder) and stored to a remote database accessible to the transceiver processing and distribution system 110. In some embodiments, the patron profile includes a patron mobile phone identifier (e.g., a phone number or an IP address) via which additional feedback can be provided to the patron.

Each monitored individual profile may further include or be correlated with a variety of data including, but not limited to, biometric data (e.g., height, weight, health data, etc.), role data, team ID, performance statistics, employee number, license number, credit card information, employment data, inventory data, group data, and other similar types of data.

In some examples, such monitored individual profile data may be pre-defined and stored in association with the unique tag or sensor identifiers. In some examples, the monitored profile data is "learned" by the system as a result of received tag or sensor data, formation data, play data, event occurrence data, route data, transaction data, and/or the like. For example, the system may determine that a tag or sensor is not correlated to a monitored individual profile and may analyze data received from the tag and/or sensor to determine possible monitored individual roles, etc., which may be ranked and then selected/confirmed by the system or by a user after being displayed by the system. In some examples, the system determines possible monitored individual roles (i.e., monitored individual role data) based on determined monitored individual location data (e.g., movement patterns, alignment position, etc.).

In some examples, as described in greater detail below, the monitored individual profile is updated by the system (e.g., to produce a data set for the monitored individual that is more robust than that established at initial registration) as a result of received tag or sensor data, formation data, play data, event occurrence data, transaction data, and/or the like. In some examples, the monitored individual profile data is used by the transceiver processing and distribution system 110 to weight the actions of the monitored individuals during analysis to assist in qualifying what is occurring, such as in determining formations, plays, event occurrences, transactions, image layouts, etc.

Tag ID and Sensor Data Transmission Architecture

FIGS. 3A-3E show block diagrams of various different architectures that may be utilized in transmitting signals from one or more of the RTLS tags 102 and the sensors 203 to one or more transceivers 106 and the transceiver hub 108. In some examples, the depicted architectures are used in connection with the transceiver processing and distribution system 110 of FIG. 1A or 1B. In some examples, more than one of the architectures of FIGS. 3A-3E may be used together in a single system.

Figure 3A:
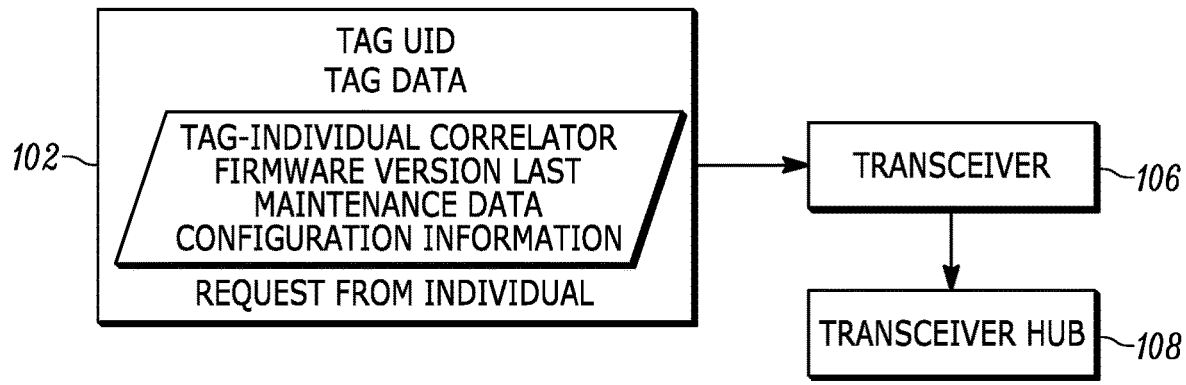
FIGS. 3A-3E are block diagrams showing the input and output of transceivers and sensor receivers of FIGS. 1A and/or 1B.

FIG. 3A shows an RTLS 102, such as that shown in FIG. 1A or 1B, which may be configured to transmit a tag signal (e.g., blink data) to one or more of the transceivers 106. The one or more of the transceivers 106 transmits a signal to the transceiver hub 108.

The example illustrated RTLS tag 102 generates or stores a tag unique identifier ("tag UID") and/or tag data as shown. The tag data may include useful information such as the installed firmware version, last tag maintenance date, configuration information, and/or a tag-individual correlator.

The tag-individual correlator includes data that indicates that a monitored individual (e.g., participant, a patron, etc.) is associated with the RTLS tag 102 (e.g., name, uniform number and team, biometric data, tag position on individual, i.e., right wrist, patron seat number, season ticket holder number, etc.). In the illustrated example, the tag-individual correlator is stored to the RTLS tag 102 when the RTLS tag 102 is registered or otherwise associated with a monitored individual (e.g., the monitored individual 212 of FIG. 2D). While shown as a separate field for illustration purposes, the tag-individual correlator may be part of any tag data or even omitted from the RTLS tag 102.

The tag signal transmitted from location tag 102 to transceiver 106 includes blink data as it is transmitted at selected intervals. A "blink rate" is set by the tag designer or the system designer to meet application requirements. In some embodiments, the blink rate is consistent for one or all tags. Alternatively, the blink rate may be data dependent or dynamically changed for load balancing or power management purposes. Blink data includes characteristics of the tag signal that allow the tag signal to be recognized by the transceiver 106 so the location of the RTLS tag 102 can be determined by the locationing system (e.g., via a locate engine implemented in the transceiver hub 108). As described above, the blink data may also comprise one or more tag data packets that include any data from the RTLS tag 102 that is intended for transmission such as, for example, in the depicted embodiment, a tag UID, tag data, a request initiated by a monitored individual, and/or a tag-individual correlator. In the case of TDOA systems, the blink data may be or include a specific pattern, code, or trigger that the transceiver 106 (or downstream receiver processing and analytics system) detects to identify that the transmission is from a particular RTLS tag 102 (e.g., a UWB tag).

The depicted example transceiver 106 receives the tag signal, which includes blink data and tag data packets as discussed above. In one embodiment, the transceiver 106 passes the received tag signal directly to the transceiver hub 108. In another embodiment, the transceiver 106 performs some basic processing on the received tag signal. For instance, the transceiver 106 may extract blink data from the tag signal and transmit the blink data to the transceiver hub 108. In the illustrated example, the transceiver 106 transmits a time measurement to the transceiver hub 108 such as a TOA measurement and/or a TDOA measurement associated with the tag signal. The time measurement may be based on any of a clock time generated or calculated in the transceiver 106, a transceiver offset value, a system time, and/or the time difference of arrival between the tag signal of the RTLS tag 102 and the tag signal of a reference tag (e.g., reference tag 104 of FIGS. 1A and 1B). The transceiver 106 additionally or alternatively determines a signal measurement from the tag signal (such as a received signal strength indication (RSSI), a direction of signal, signal polarity, or signal phase) and transmit the signal measurement to the transceiver hub 108.

Figure 3B:
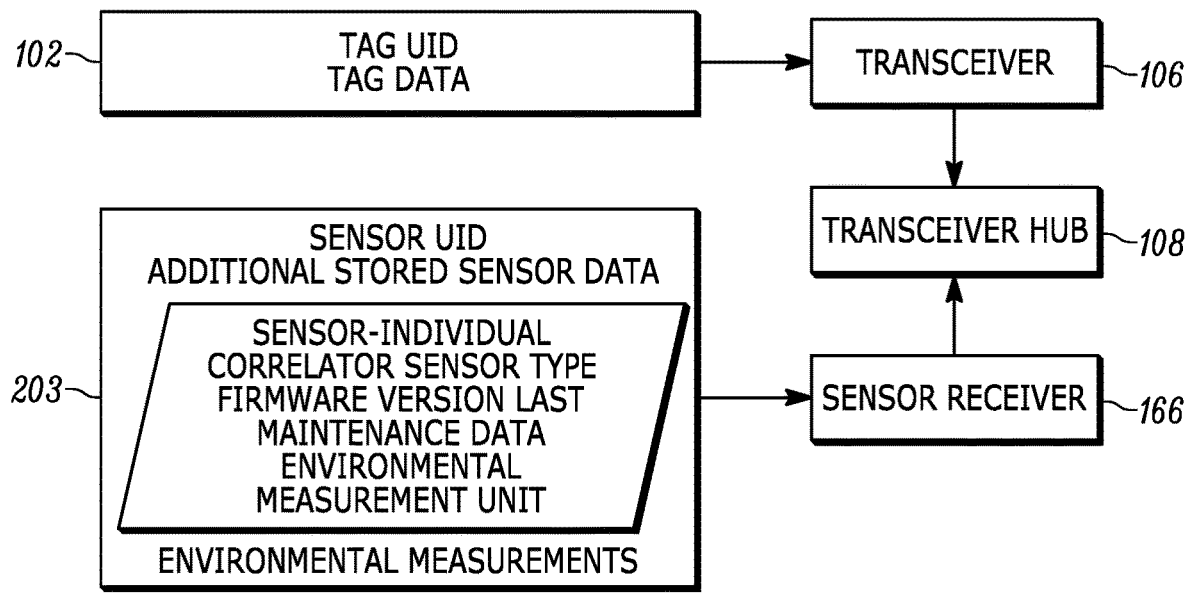

FIG. 3B shows an RTLS tag 102 and a sensor 203, such as those worn by a monitored individual as shown in FIG. 2, which may be configured to transmit tag signals to a transceiver 106 and sensor signals to a sensor receiver 166. The transceiver 106 and the sensor receiver 166 transmit received signals to the transceiver hub 108. In some examples, the transceiver 106 and the sensor receiver 166 share physical components, such as a housing, a battery, or an antenna.

The depicted RTLS tag 102 includes a tag UID and tag data (such as a tag-individual correlator or a request initiated by the monitored individual 212) and transmits a tag signal comprising blink data as discussed above. The depicted sensor 203 generate and/or stores a sensor UID, additional stored sensor data (e.g., a sensor-individual correlator, sensor type, sensor firmware version, last maintenance date, the units in which environmental measurements are transmitted, etc.), and environmental measurements. The "additional stored sensor data" of the sensor 203 includes any data that is intended for transmission to, for example, an RTLS tag 202, the reference tag 104, the sensor receiver 166, the transceiver 106, and/or the transceiver hub 108.

The sensor-individual correlator includes data (e.g., name, uniform number and team, biometric data, sensor position on individual, e.g., right wrist, patron seat number, season ticket holder number, etc.) that identifies a monitored individual is associated with the sensor 203. The sensor-individual correlator is stored to the sensor 203 when, for example, the sensor 203 is registered or otherwise associated with a monitored individual.

Sensors such as the example sensor 203 may sense or determine one or more environmental conditions (e.g., temperature, pressure, pulse, heartbeat, rotation, velocity, acceleration, radiation, position, chemical concentration, voltage) and store or transmit "environmental measurements" that are indicative of such conditions. As generally used herein, the term "environmental measurements" includes measurements concerning the environment proximate the sensor including, without limitation, ambient information (e.g., temperature, position, humidity, etc.) and information concerning an individual's health, fitness, operation, and/or performance. Environmental measurements are stored or transmitted in either analog or digital form and are transmitted as individual measurements, as a set of individual measurements, and/or as summary statistics. For example, temperature in degrees Celsius may be transmitted as {31}, or as {33, 32, 27, 22, 20, 23, 27, 30, 34, 31}, or as {27.9}. In some embodiments, the sensor-individual correlator is determined at least in part from the environmental measurements.

Figure 3C:
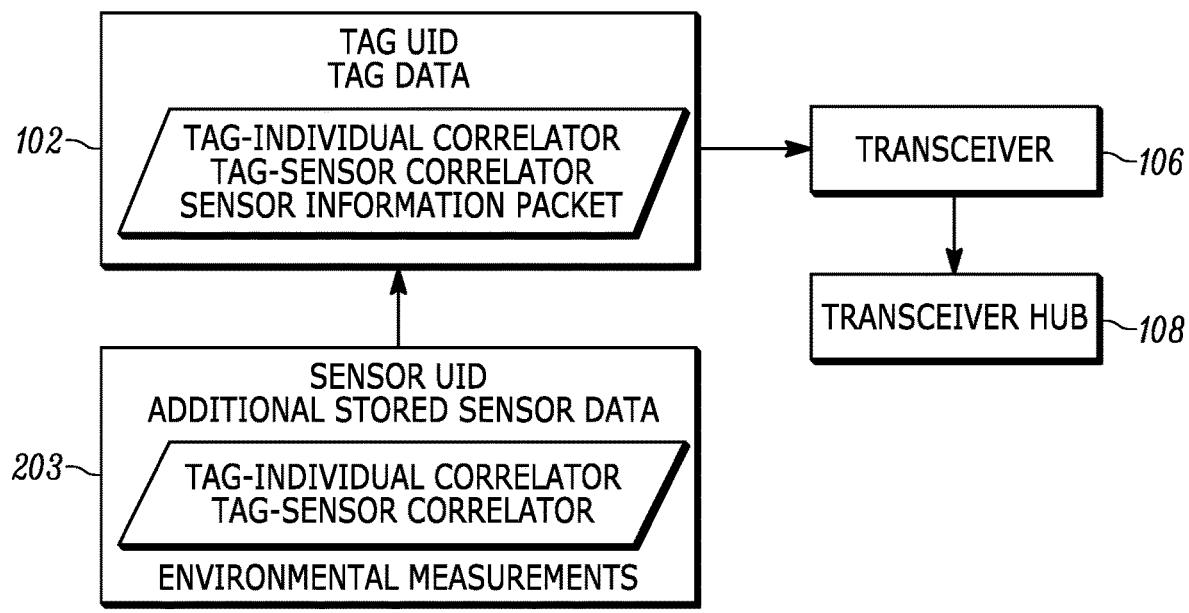

FIG. 3C depicts an example sensor 203 communicating through an example RTLS tag 102. In one embodiment, the sensor 203 is part of (e.g., resides in the same housing or assembly structure) of the RTLS tag 102. In another embodiment, the sensor 203 is distinct from (e.g., not resident in the same housing or assembly structure) the RTLS tag 102 and configured to communicate via wired or wireless communication with the RTLS tag 102.

In some examples, the RTLS tag 102, the sensor 203, or both, generate and/or store a tag-sensor correlator that indicates an association between the RTLS tag 102 and the sensor 203 (e.g., tag UID/sensor UID, distance from tag to sensor in a particular stance, set of sensors associated with a set of tags, sensor types associated with a tag, etc.). In the depicted embodiment, both the RTLS tag 102 and the sensor 203 store the tag-sensor correlator.

In the depicted embodiment, the sensor 203 transmits a sensor signal to the RTLS location tag 102. The sensor signal includes one or more sensor information packets as discussed above. The sensor information packets include the sensor UID, a sensor-individual correlator, additional stored sensor data, the tag-sensor correlator, and/or the environmental measurements. The RTLS tag 102 stores some portion of, or all of, the sensor information packets locally and packages the sensor information packets into one or more tag data packets for transmission to the transceivers 106 as part of a tag signal or simply pass them along as part of its tag signal.

Figure 3D:
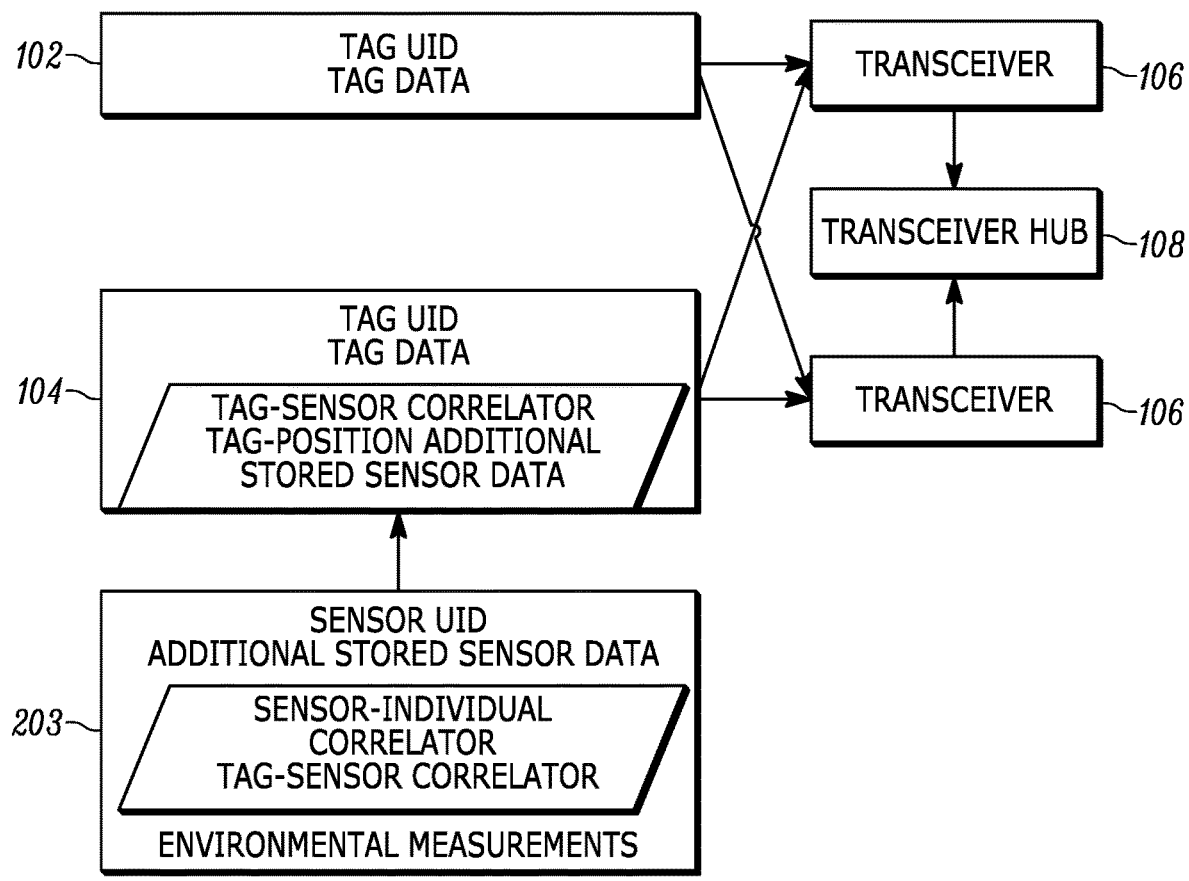

FIG. 3D illustrates an example communication structure for an example reference tag 104 (e.g., the reference tag 104 of FIG. 1A), an example RTLS tag 102, a sensor 203, and two transceivers 106. The depicted reference tag 104 is a RTLS tag that includes tag data, such as a tag UID, and is capable of transmitting tag data packets. In some embodiments, the reference tag 104 forms part of a sensor and may thus be capable of transmitting sensor information packets.

The depicted sensor 203 transmits a sensor signal to the reference tag 104. The reference tag 104 stores some portion or some or all of the sensor information packets locally and packages the sensor information packets into one or more tag data packets for transmission to the transceivers 106 as part of a tag signal, or simply pass them along as part of its tag signal.

As was described above in connection with FIG. 1, the transceivers 106 of FIG. 3D are configured to receive tag signals from the RTLS tag 102 and the reference tag 104. Each of these tag signals includes blink data, which comprises tag UIDs, tag data packets, requests from monitored individuals, and/or sensor information packets. The transceivers 106 transmit signals via wired or wireless communication to the transceiver hub 108.

Figure 3E:
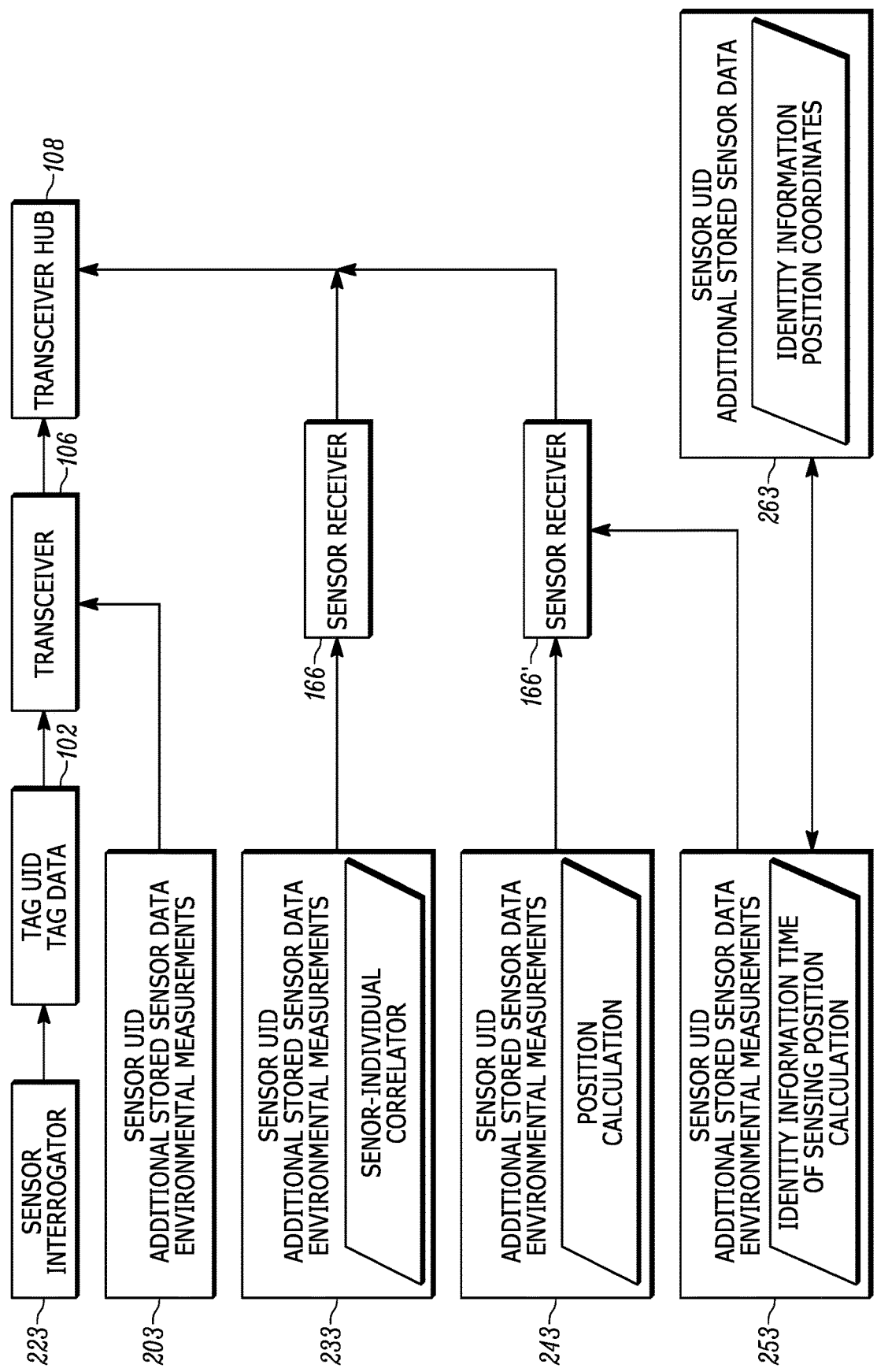

FIG. 3E illustrates an example communication structure between an example RTLS tag 102, a plurality of transceivers 106, and a variety of sensor types, such as a sensor 203, a diagnostic device 233, a triangulation positioner 243, a proximity positioner 253, and a proximity label 263. In the depicted embodiment, none of the sensors 203, 233, 243, 253 form part of the RTLS tag 102 or the reference tag 104. However, each may comprise a sensor UID and additional stored sensor data. Each of the depicted sensors 203, 233, 243, 253 transmits sensor signals comprising sensor information packets.

As illustrated, the transceiver 106 receives a tag signal from the RTLS tag 102 and a sensor signal from the sensor 203. In such embodiments, the sensor 203 is configured to communicate in a communication protocol that is common to the RTLS tag 102.

FIG. 3E depicts one type of sensor referred to herein as a "proximity interrogator." The proximity interrogator 223 includes circuitry operative to generate a magnetic, electromagnetic, or other field that is detectable by the RTLS tag 102. The proximity interrogator 223 includes a sensor UID and other tag or sensor derived data, as discussed above.

In some embodiments, the proximity interrogator 223 operates as a proximity communication device that triggers the RTLS tag 102 (e.g., by the RTLS tag 102 detecting the field produced by the proximity interrogator 223) to transmit blink data under an alternate blink pattern or blink rate. In some examples, the RTLS tag 102 initiates a preprogrammed (and typically faster) blink rate to allow more location points for tracking the corresponding monitored individual. In some embodiments, the RTLS tag 102 does not transmit a tag signal until triggered by the proximity interrogator 223. In some embodiments, the RTLS tag 102 is triggered when the RTLS tag 102 moves near (e.g., within communication proximity to) the proximity interrogator 223. In some embodiments, the RTLS tag 102 is triggered when the proximity interrogator 223 moves near the RTLS tag 102.

In some embodiments, the RTLS tag 102 is triggered when a button is pressed or a switch is activated on the proximity interrogator 223 or on the RTLS tag 102 (or a wearable location device including the RTLS tag 102, such as the wearable location devices 112 of FIGS. 2E and 2F) itself. For example, a proximity interrogator 223 is placed at the start line of a racetrack. Every time a car passes the start line, a car-mounted RTLS tag 102 senses the signal from the proximity interrogator 223 and is triggered to transmit a tag signal indicating that a lap has been completed. As another example, the proximity interrogator 223 is placed at a Gatorade cooler. Each time a player or other participant fills a cup from the cooler a participant-mounted RTLS tag 102 senses the signal from the proximity interrogator 223 and is triggered to transmit a tag signal indicating that Gatorade has been obtained. As another example, the proximity interrogator 223 is placed on a medical cart. When paramedics use the medical cart to pick up a participant (e.g., a player) and move him/her to the locker room, the participant-mounted RTLS tag 102 senses the signal from the proximity interrogator 223 and is triggered to transmit a tag signal indicating that they have been removed from the game. As described above, any of the tag signals sent after the triggering may differ from pre-triggered tag signals in terms of any aspect of the analog and/or digital attributes of the transmitted tag signal.

FIG. 3E further depicts another type of sensor that is generally not worn by a monitored individual and is referred to herein as a "diagnostic device." Like other sensors, diagnostic devices may measure one or more environmental conditions and store corresponding environmental measurements in analog or digital form.

While the depicted diagnostic device 233 is not worn by a monitored individual, the diagnostic device 223 generates and stores a sensor-individual correlator for association with environmental measurements taken in connection with a specific monitored individual. For example, in one embodiment, the diagnostic device 233 is a blood pressure meter that is configured to store, as environmental measurements, blood pressure data for a monitored individual. Each set of environmental measurements (e.g., blood pressure data) is stored and associated with a sensor-individual correlator.

The depicted diagnostic device 233 is configured to transmit a sensor signal comprising sensor information packets to a sensor receiver 166. The sensor information packets include one or more of the sensor UID, the additional stored data, the environmental measurements, and/or the sensor-individual correlator as discussed above. The sensor receiver 166 associates some or all of the data from the sensor information packets with other stored data in the sensor receiver 166 or with data stored or received from other sensors 203, diagnostic devices 203, RTLS tags 102, or reference tags 104. The sensor receiver 166 transmits a sensor receiver signal to the transceiver hub 108.

Another type of sensor shown in FIG. 3E is a triangulation positioner 243. A "triangulation positioner" is a type of sensor that senses position. The depicted triangulation positioner 243 includes a sensor UID, additional stored sensor data, and environmental measurements, as discussed above.

In some embodiments, a triangulation positioner 243 (also known as a global positioning system (GPS) receiver) receives clock data transmitted by one or more geostationary satellites (a satellite in a known or knowable position) and/or one or more ground based transmitters (also in known or knowable positions), compares the received clock data, and compute a "position calculation." The position calculation may be included in one or more sensor information packets as environmental measurements.

In another embodiment, a triangulation positioner 243 includes one or more cameras or image-analyzers that receive emitted or reflected light or heat. The triangulation positioner 243 analyzes the received images to determine the location of a monitored individual or sensor. Although the triangulation positioner 243 may transmit data wirelessly, it differs from the RTLS tag 102 in that it does not transmit blink data or a tag signal that can be used by the transceiver hub 108 to calculate location. To this end, the triangulation positioner 243 senses position and computes a position calculation that may then be used as environmental measurements by the transceiver hub 108.

In one embodiment, the triangulation positioner 243 is combined with, for example, the RTLS tag 102 or the reference tag 104. In such embodiments, the triangulation positioner 243 computes and transmits its position calculation via the RTLS tag 102 to one or more transceivers 106. In some examples, the transceiver hub 108 calculates tag location based on the blink data received as part of the tag signal and not based solely on the position calculation. The position calculation may also be considered as environmental measurements and included in associated sensor information packets.

Position calculations (e.g., GPS receiver position calculations) are not as accurate as the location calculations (e.g., UWB waveform based location calculations) performed by the transceiver hub 108. That is not to say that position calculations may not be improved using known techniques. For example, a number of influences, including atmospheric conditions, can cause GPS accuracy to vary over time. One way to control this is to use a differential global positioning system (DGPS) comprising one or a network of stationary triangulation positioners that are placed in a known position, and the coordinates of the known position are stored in memory as additional stored sensor data. These triangulation positioners receive clock data from geostationary satellites, determine a position calculation, and broadcast a difference between the position calculation and the stored coordinates. This DGPS correction signal can be used to correct for these influences and significantly reduce location estimate error.

Another type of sensor shown in FIG. 3E is a proximity detector 253. A "proximity detector" is a type of sensor that senses identity within an area (e.g., a local area) that is relatively smaller with respect to the monitored area 101 of FIG. 1A or 1B. Many different ways of sensing identity (e.g., a unique ID or other identifier for a sensed object or individual) may be implemented, including, without limitation, reading a linear bar code, reading a two-dimensional bar code, reading a near field communication (NFC) tag, reading a RFID tag such as a UHF tag, HF tag, or low frequency tag, an optical character recognition device, a biometric scanner, or a facial recognition system.

In some embodiments, a proximity detector senses an attribute of an individual (or an individual's wristband, tag, label, card, badge, clothing, uniform, costume, phone, ticket, etc.). The identity sensed by a proximity detector is stored locally at the proximity detector 253 as shown and transmitted as environmental measurements via one or more sensor information packets to the sensor receiver 166.

In some embodiments, the proximity detector 253 has a defined position, which is stationary, and is associated with a location in the monitored area 101 of FIG. 1A or 1B. For example, the proximity detector 253 may be located at a finish line of a race track, an entrance gate of a venue, with a diagnostic device 243, at a goal line or goal post of a football field, at a base or home plate of a baseball diamond, or a similar fixed location. In embodiments where the proximity detector 253 is stationary, the position coordinates of the proximity detector and a sensor UID are stored to a monitored area database that is accessible by one or more of the transceivers 106, the sensor receiver 166, the transceiver hub 108, and/or other components of the transceiver processing and distribution system 110. In embodiments where the proximity detector 253 is movable, a position calculation is determined with, for example, the triangulation positioner 243, or the proximity detector 253 may be combined with an RTLS tag 102 and located by the transceiver hub 108. While shown as separate fields for illustration purposes in FIG. 3E, identity information and position calculation may comprise part of the additional stored sensor data, the environmental measurements, or both.

In one embodiment, the proximity detector 253 is associated with a reference tag 104 (e.g., the reference tag 104 of FIG. 1A) whose position is recorded in the monitored area database. In other embodiments, the proximity detector 253 is movable, such that it may be transported to where it is needed. For example, the proximity detector 253 may be located on a medical cart, a first down marker, a diagnostic device, a goal post, or carried by a paramedic or security guard. In embodiments where the proximity detector 253 is movable, the proximity detector 253 is associated with an RTLS tag 102 or a triangulation positioner 243 such that location (for an RTLS tag 102) or position (for a triangulation positioner 243) may be determined at the time identity is sensed.

In embodiments where the proximity detector 253 includes an RTLS tag 102, the transceiver hub 108 locates the associated RTLS tag 102, and a tag data/sensor data filter associates the tag location data for the associated RTLS tag 102 as the location of the proximity detector 253 while determining the identity of an associated individual from any received sensor information packets. In alternate embodiments where the proximity detector 253 includes a triangulation positioner 243, the triangulation positioner 243 computes a position calculation that is stored as additional stored sensor data and/or environmental measurements, and transmitted as one or more sensor information packets. In some embodiments, sensor information packets for a proximity detector 253 include both sensed identity information and a position calculation.

Another type of sensor shown in FIG. 3E is an example proximity label 263. The depicted proximity label 263 has a fixed position and an identification code (e.g., a sensor UID). The proximity label 263 may further include additional stored sensor data as shown. The depicted proximity label 263 is configured to be read by the proximity detector 253. In some embodiments, the proximity detector 253 is configured to write information to the proximity label 263.

The proximity label 263 is, for example, a sticker, card, tag, passive RFID tag, active RFID tag, NFC tag, ticket, metal plate, electronic display, electronic paper, inked surface, sundial, or otherwise visible or machine readable identification device. The coordinates of the position of the proximity label 263 are stored such that they are accessible to the transceiver hub 108. For example, the position coordinates of the proximity label 263 may be stored in a field database or monitored area database accessible via a network, or stored locally as additional stored data in the proximity detector 253.

In some embodiments, a position of the proximity label 263 is encoded into the proximity label 263 itself. For example, coordinates of a position of the proximity label 263 may be encoded into a passive RFID tag that is placed in that position. As another example, the coordinates of a position of the proximity label 263 may be encoded into a printed barcode that is placed in that position. As another example, the proximity label 263 may include a NFC tag that is encoded with the location "end zone" where the NFC tag may be placed at or near an end zone. In some embodiments, the stored coordinates of the proximity label 263 are offset from the actual coordinates of the proximity label 263 by a known or determinable amount.

In some embodiments, the proximity label 263 includes a NFC tag encoded with a position. When a sensor such as a proximity detector 253 approaches the NFC tag the sensor may read the position, then transmit the position in a sensor information packet to, for example, the sensor receiver 166' and eventually to the transceiver hub 108. In some embodiments, the proximity label 263 includes a barcode label encoded with an identification code. When a smartphone with a proximity detector 253 (such as a barcode imager) and a triangulation positioner 243 (such as a GPS chip, GPS application, or similar device) approaches the barcode label it may read the identification code from the barcode, determine a position calculation from received clock data, then transmit the identity and the position calculation to sensor receiver 166' and eventually to the transceiver hub 106 as part of one or more sensor information packets.

In the depicted embodiment, the triangulation positioner 243 and the proximity detector 253 are configured to transmit sensor signals carrying sensor information packets to the sensor receiver 166'. The depicted sensors 243, 253, like any sensor discussed herein, may transmit sensor signals via wired or wireless communication protocols. For example, any proprietary or standard wireless protocol (e.g., 802.11, Zigbee, ISO/IEC 802.15.4, ISO/IEC 18000, IrDA, Bluetooth, CDMA, or any other protocol) may be used for the sensor signals. Alternatively or additionally, any standard or proprietary wired communication protocol (e.g., Ethernet, Parallel, Serial, RS-232, RS-422, USB, Firewire, I.sup.2C, etc.) may be used. Similarly, the sensor receiver 166' and any transceiver discussed herein may use similar wired and wireless protocols to transmit signals to the transceiver hub 108.

In some embodiments, upon receiving sensor signals from the triangulation positioner 243 and the proximity detector 253, the sensor receiver 166' associates some or all of the data from the received sensor information packets with other data stored to the sensor receiver 166', or with data stored or received from other sensors (e.g., sensor 203), diagnostic devices 233, RTLS tags 102, or reference tags 104. Such associated data is referred to herein as "associated sensor data." In the depicted embodiment, the sensor receiver 166' is configured to transmit some or all of the received sensor information packets and any associated sensor data to the transceiver hub 108.

In some embodiments, a smartphone comprising a proximity detector 253 (such as a barcode imager) and a triangulation positioner 243 (such as a GPS chip) associates an identification code determined from a barcode with a position calculation from received clock data as associated sensor data. The smart phone transmits a sensor information packet that includes such associated sensor data to the transceiver hub 108. In some embodiments, the smartphone transmits a first sensor information packet including the identification code and the smartphone's unique identifier to another sensor receiver 166', the smartphone transmits a second sensor information packet including the position calculation and the smartphone's unique identifier to the sensor receiver 166, and the sensor receiver 166 associates the position calculation with the identification code based on the common smartphone unique identifier and transmit such associated sensor data to the transceiver hub 108. In some embodiments, the sensor receiver 166 determines a first time measurement associated with the first sensor information packet and a second time measurement associated with the second sensor information packet that, in conjunction with the sensor UID, may be used, by the transceiver hub 108 to associate the first sensor information packet with the second sensor information packet.

In some embodiments, the transceiver hub 108 receives signals from the transceiver 106 and sensor receiver signals from the sensor receivers 166, 166'. In the depicted embodiment, the transceiver 106 receives blink data from the RTLS tags 102 and transmits to the transceiver hub 108 some or all of the blink data. In some embodiments, the transceiver 106 includes additional time measurements or signal measurements that are based on a tag signal received from a reference tag (e.g., reference tag 104 of FIG. 1). The transceiver hub 108 collects the blink data, time measurements (e.g. time of arrival, time difference of arrival, phase), and/or signal measurements (e.g. signal strength, signal direction, signal polarization, signal phase) from the transceivers 106 and computes tag location data for the RTLS tags 102 as discussed above in connection with FIGS. 1A and 1B. In some embodiments, the transceivers 106 are configured with appropriate RF filters, such as to filter out potentially interfering signals or reflections proximate the field of play or other area to be monitored.

The depicted transceiver hub 108 accesses stored data or clock data from local storage and from a network location. The depicted transceiver hub 108 uses this information to determine tag location data for each RTLS tag 102. The depicted transceiver hub 108 associates data derived or extracted from tag signals transmitted from the one or more RTLS tags 102 with information or data derived or extracted from sensor signals transmitted from the one or more sensors 203.

In addition to the TOA or TDOA systems previously described, other real-time location systems (RTLS) such as received signal strength indication based systems could potentially be implemented by a transceiver hub 108. Any RTLS system using RTLS location tags 102, including those described herein, may require considerable processing by the transceiver hub 108 to determine the tag location data from the blink data received from the RTLS tags 102. These may require time measurement and/or signal measurement in addition to blink data, which may include a tag UID. In contrast, in other systems, such as global position systems (GPS) systems, location data may be determined based upon the position calculation transmitted from a GPS transmitter (also referred to as a GPS receiver or GPS tag) which includes calculated information about the location where the tag was positioned (i.e., coordinates determined at the tag via satellite signal triangulation, etc.) when the position calculation was determined or stored. Thus, GPS information typically refers to additional information that is transmitted along with a GPS transmitter ID before the transmission is received by a sensor receiver 166.

A GPS host device or back-end server may receive the GPS information and simply parse the position calculation (as opposed to calculating the position information at the host device) and the GPS transmitter ID into a data record. This data record may be used as a GPS position calculation, converted to a different coordinate system to be used as a GPS position calculation, or further processed with DGPS information to be used as a GPS position calculation.

Returning to FIG. 3C, the depicted RTLS tag 202 may be used to convey (sometimes called backhaul) sensor information packets to the transceiver 106. In some embodiments, multiple sensors 203 transmit sensor signals carrying sensor information packets to the RTLS tag 202. Such received sensor information packets may be associated with blink data that is transmitted to the transceiver 106.

In some embodiments, the transceiver hub 108 parses sensor information packets from received tag data packets and associates such sensor information packets with the RTLS tag 202 that transmitted the sensor information packet. Thus, the transceiver hub 108 is able to determine tag location data, including a location and other data (e.g., tag data, tag UID, tag-individual correlator, sensor-individual correlator, additional stored sensor data, environmental measurements, tag-sensor correlator, identity information, position calculation, etc.) from one or more RTLS tags 102 or sensors 203. Such data and information may be transmitted to the transceiver processing and distribution system 110.

In some embodiments, after the transceiver hub 108 determines a location estimate of an RTLS tag 102 at the time epoch of the tag signal, the transceiver hub 108 associates a location estimate with the tag data packet included in the blink data of such tag signal. In some embodiments, the location estimate of the tag signal is used as tag location data for the tag data packet. In some embodiments, a Geographical Information System (GIS) is used by the transceiver hub 108 to refine a location estimate, or to map a location estimate in one coordinate system to a location estimate in a different coordinate system, to provide a location estimate for the tag data packet.

In some embodiments, the location estimate for the tag data packet is associated with any data in the tag data packet, including a tag UID, other tag data, and, if included, one or more sensor information packets, including sensor UID, additional stored sensor data, and environmental measurements. Because environmental measurements may include a position calculation from a triangulation positioner (e.g., a GPS device), the transceiver hub 108 may parse the position calculation to refine a location estimate for the tag data packet.

In some embodiments, the transceiver hub 108 accesses a monitored individual database to determine tag-individual correlators or sensor-individual correlators. Monitored individual data (e.g., an individual profile) may be stored at a server, a tag memory, a sensor memory, or at other storage accessible via a network or communication system, including tag data or additional stored sensor data.

In some embodiments, by comparing data accessed using a sensor-individual correlator, the transceiver hub 108 associates a monitored individual with a sensor information packet received from the sensor 203, and/or may associate a monitored individual with the sensor 203. Because the transceiver hub 108 associates a sensor position estimate with a sensor information packet, the transceiver hub 108 estimates an individual position for the associated monitored individual.

In some embodiments, by comparing data accessed using a tag-sensor correlator, the transceiver hub 108 associates the sensor 203 with a tag data packet received from an RTLS tag 102. Because the transceiver hub 108 associates a location estimate with a tag data packet, the transceiver hub 108 creates a sensor location estimate for the associated sensor 203. By comparing a location estimate for an RTLS tag 102 with a sensor location estimate or a sensor position estimate, the transceiver hub 108 associates an RTLS tag 102 with a sensor 203, or may associate a tag data packet with a sensor information packet. The depicted transceiver hub 108 determines a new or refined tag-sensor correlator based on this association.

In some embodiments, by comparing a location estimate for an RTLS tag 102 with an individual location estimate or an individual position estimate, the transceiver hub 108 associates the RTLS tag 102 with a monitored individual, or may associate a tag data packet with the monitored individual. The transceiver hub 108 determines a new or refined tag-individual correlator based on this association.

In some embodiments, by comparing a location estimate for a sensor 203 with an individual location estimate or an individual position estimate, the transceiver hub 108 associates the sensor 203 with a monitored individual, or may associate a sensor information packet with the monitored individual. The transceiver hub 108 determines a new or refined sensor-individual correlator based on this association.

Data derived or extracted from tag signals transmitted from one or more RTLS tags 102 is generally referred to herein as "tag derived data" and may include, without limitation, tag data, tag UID, tag-individual correlator, tag-sensor correlator, tag data packets, blink data, time measurements (e.g. time of arrival, time difference of arrival, phase), signal measurements (e.g., signal strength, signal direction, signal polarization, signal phase) tag location data (e.g., including tag location estimates), and requests initiated by an associated monitored individual. Tag derived data is not derived by the RTLS tag 102, but rather, is derived from information transmitted by the RTLS tag 102. Information or data derived or extracted from sensor signals transmitted from one or more sensors is generally referred to herein as "sensor derived data" and may include, without limitation, sensor UID, additional stored sensor data, sensor-individual correlator, environmental measurements, sensor information packets, position calculations (including sensor position estimates), position information, identity information, tag-sensor correlator, and associated sensor data.

Data derived or extracted from stored individual data is referred to herein as "individual profile information," "participant profile information," "patron profile information" or simply "profile information" and may include, without limitation tag-individual correlator, sensor-individual correlator, identity information, name, uniform number and team, biometric data, tag position on individual, patron seat number, payment information, season ticket holder number, patron group correlations, and other similar information. In various embodiments, the transceiver hub 108 transmits tag derived data, sensor derived data, individual profile information, various combinations thereof, and/or any information from the GIS, the field database, the monitored area database, and the monitored individual database to the transceiver processing and distribution system 110.

Locationing Wristband Instruction Transmission Architecture

Figure 4A:
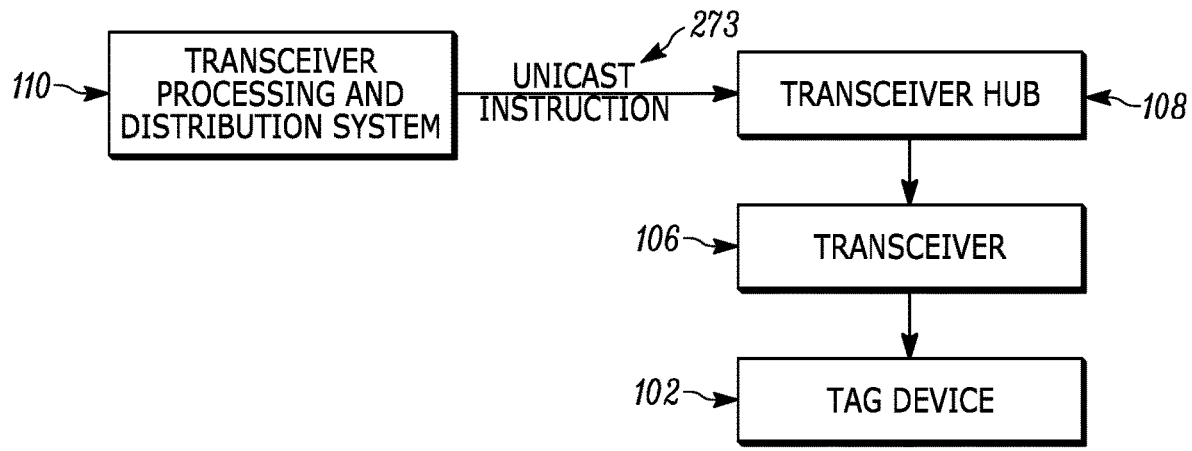
FIGS. 4A and 4B are block diagrams showing the input and output of transceivers in accordance with teachings of this disclosure.
Figure 4B:
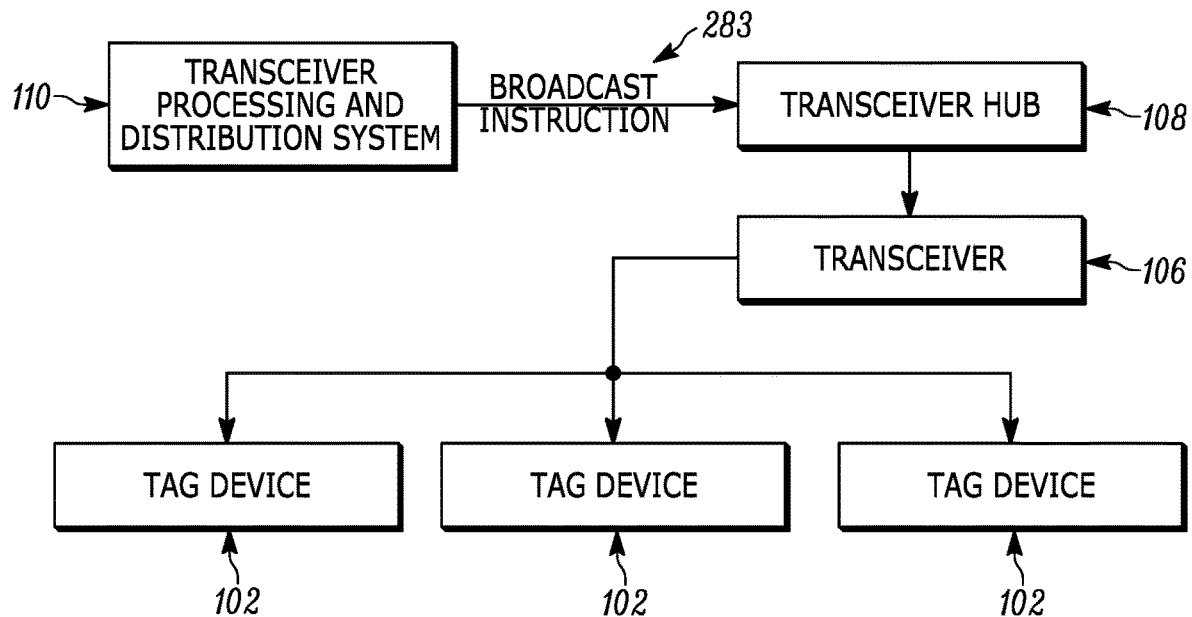

FIGS. 4A and 4B show block diagrams representative of different architectures that may be utilized in transmitting signals from, for example, the transceiver processing and distribution system 110 of FIGS. 1A and 1B to one or more wearable location devices 112 that include an RTLS tag 102 in accordance with teachings of this disclosure. As detailed below, the example transceivers 106 relay the instruction from the transceiver processing and distribution system 110 to the wearable location devices 112.

FIG. 4A illustrates an example transceiver processing and distribution system 110, such as the one described with respect to FIG. 1A or 1B, which is configured to transmit a unicast instruction to a wearable location device 112. In the illustrated example, the unicast instruction includes two components: a device identification component, and a payload (or instruction) component. For example, the transceiver processing and distribution system 110 may have determined that the wearable location device 112 associated with John Smith, a patron, should emit white light from an LED or display band. As described in detail below, the transceiver processing and distribution system 110 selects such an output for the wearable location device 112 based on, for example, a current (i.e., real-time) location of the wearable location device 112 as calculated according to the RTLS tag 102 housed therein. In such instances, the unicast instruction includes a device identification component that has an identifier associated with the wearable location device 112 associated with John Smith and a payload component including an instruction to emit white light formatted in compliance with an API of the wearable location device 112 (e.g., setLEDColor(255,255,255)).

To determine the identifier included in the identification component, the example transceiver processing and distribution system 110 queries the monitored individual database that stored tag-individual correlators. Accordingly, the identification component includes the tag UID for the RTLS tag 102 included in the wearable location device 112, a name associated with the monitored individual, a unique individual identifier assigned upon registration with the transceiver processing and distribution system 110, a MAC or IP address associated with the wearable location device 112, or any other identifier that can uniquely identify a particular wearable location device 112 from among a plurality of wearable location devices 112.

After generating the unicast instruction, the example transceiver processing and distribution system 110 forwards the unicast instruction onto the transceiver hub 108 for routing to the wearable location device 112. In some examples, one of the transceiver processing and distribution system 110 or the transceiver hub 108 accesses location data for the wearable location device 112 of interest to identify a particular transceiver 106 that is currently servicing the position at which the wearable location device 112 is located. In some embodiments, as described herein, the location data for the wearable location device 112 is stored at the monitored individual database.

The example transceiver hub 108 then forwards the unicast instruction to the particular transceiver 106 for transmission to the wearable location device 112. As described herein, any proprietary or standard wireless protocol (e.g., 802.11, Zigbee, ISO/IEC 802.15.4, ISO/IEC 18000, IrDA, Bluetooth, CDMA, or any other protocol) and/or any standard or proprietary wired communication protocol (e.g., Ethernet, Parallel, Serial, RS-232, RS-422, USB, Firewire, I.sup.2C, etc.) may be used to support communication of the instructions between the transceiver processing and distribution system 110, the transceiver hub 108, and/or the transceiver 106. Similarly, any proprietary or standard wireless protocol may be used to support communications between the transceiver 106 and the wearable location device 112.

All wearable location devices 112 serviced by the transceiver 106 may detect the transmitted the unicast message. Accordingly, the locationing wristband 112 verifies that that the unicast instruction is, in fact, directed to the wearable location device 112. To this end, the example wearable location device 112 compares the identifier included in the identification component of the unicast message to an identifier stored at a memory of the wearable location device 112. When the wearable location device 112 determines that the identifiers match, the wearable location device 112 executes the instructions included in the payload of the unicast instruction. On the other hand, if the wearable location device 112 determines that the identifiers do not match (e.g., the unicast message is intended for another wearable location device 112), the wearable location device 112 ignores the payload.

FIG. 4B illustrates an example transceiver processing and distribution system 110, such as the one described with respect to FIG. 1A or 1B, which is configured to transmit a broadcast instruction to all wearable location device 112 within a particular region of the venue. In some embodiments, the broadcast instruction includes two components: a device identification component, and a payload (or instruction) component. However, unlike the unicast instruction, the broadcast instruction includes a pre-determined identifier that indicates that all wearable location device 112 that receive the broadcast message should act on the payload.

For example, the transceiver processing and distribution system 110 may have determined that the north side of a venue should be illuminated in red light. Accordingly, the broadcast instruction may include a payload component including an instruction to emit red light formatted in compliance with an API of the wearable location device 112.

In the illustrated example, after generating the broadcast instruction, the example transceiver processing and distribution system 110 forwards the broadcast instruction onto the transceiver hub 108 for routing. More particularly, one of the transceiver processing and distribution system 110 or the transceiver hub/locate engine 108 accesses location data for the one or more transceivers 106 to identify any transceiver(s) 106 that transmits into the intended region (in the previous example, the north side of the venue). Accordingly, the transceiver hub 108 then routes the broadcast instruction to the identified transceiver(s) 106, which, in turn, broadcasts the broadcast instruction to the wearable location device 112 within their corresponding transmission area. The wearable location devices 112 that receive the broadcast instruction execute the payload included therein.

Example Transceiver Hub and Transceiver Processing and Distribution System

Figure 5:
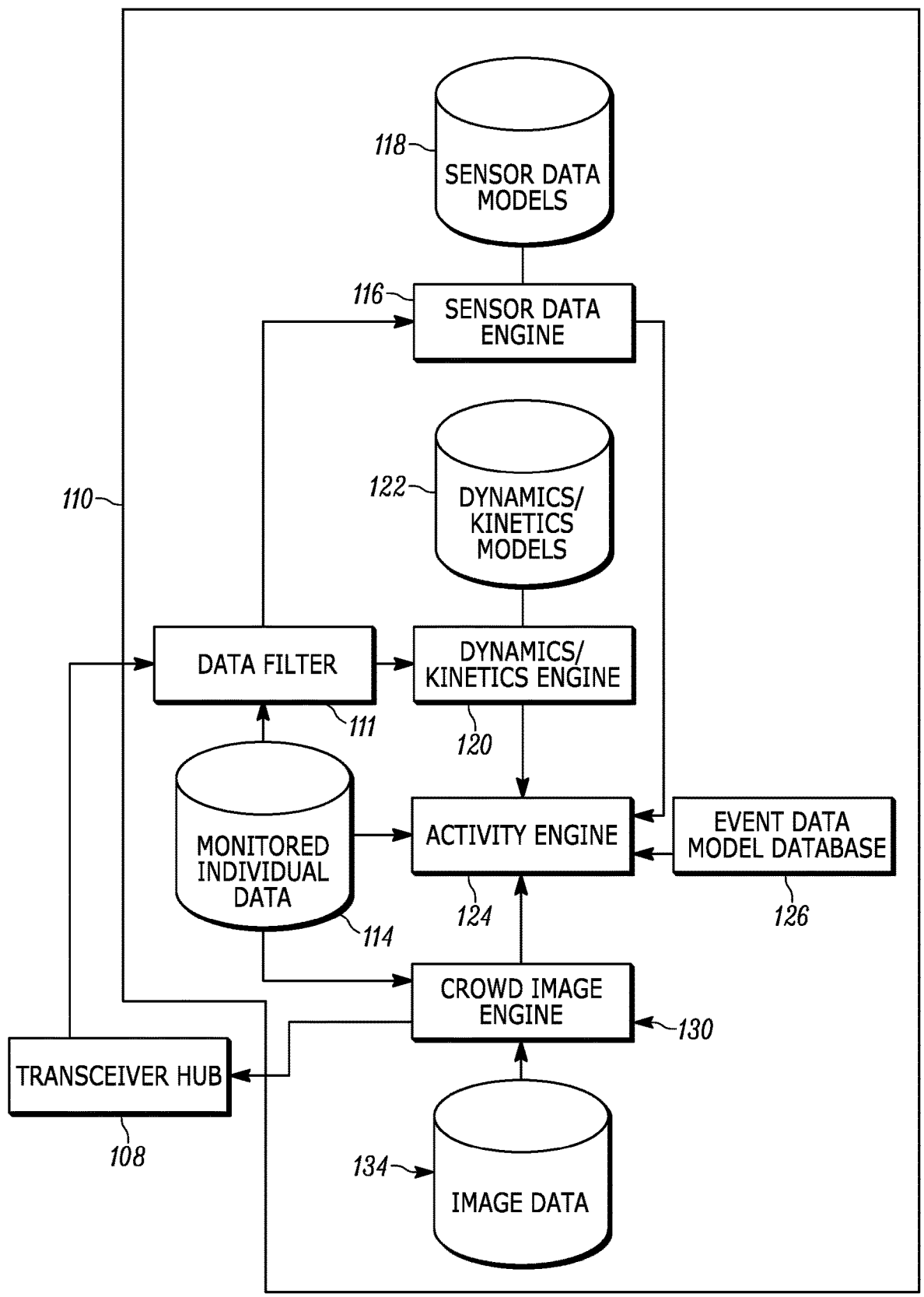
FIG. 5 illustrates an example system for providing bi-directional communications in accordance with teachings of this disclosure.

FIG. 5 shows a block diagram of a transceiver receiver processing and distribution system 110 constructed in accordance with teachings of this disclosure. The example transceiver hub 108 is configured to send and receive data (e.g., tag derived data, sensor derived data, individual profile information, reference tag data, unicast or broadcast instructions, etc.) from or to one or more transceivers 106. In some embodiments, the transceiver hub 108 accesses or provides a data transmission link to each of the transceivers 106 in succession and download data buffered in the transceivers 106 (e.g., as transceiver by receivers 106 since transceiver hub 108 last accessed the data at transceiver 106).

The depicted example transceiver hub 108 is configured to determine tag location data for each of the RTLS tags 102 by processing, for example, TOA measurement data (and reference tag data, when applicable) received from transceivers 106. The transceiver hub 108 provides the tag location data to the transceiver processing and distribution system 110. In the depicted example, the transceiver processing and distribution system 110 includes data filter 111 configured to associate the location data and/or sensor data to a particular monitored individual using a monitored individual database 114. Monitored individuals are associated with identifying data (e.g., individual profile information) such as a unique identifier, name, role (e.g., a participant, a patron, a mobile merchant, or the like), identification number, seat number, group identifier, or the like and the tag location data and/or sensor derived data may be associated with the identifying data. As such, the monitored individual database 114 may be populated with information for RTLS tags 102 and/or sensors 203 that are correlated to particular monitored individuals and/or with particular positions on monitored individuals where the tags/sensors are placed.

In some embodiments, the RTLS tags 102 are configured to transmit a tag identifier (e.g., tag UID) that may be associated with individual profile information, which includes, without limitation, tag placement data (i.e., tag position on individual), etc., in the monitored individual database 114. In some embodiments, the RTLS tags 102 may transmit individual profile information or other identifying data and/or tag placement data rather than a tag identifier. In some embodiments, the monitored individual database 114 may further include individual profile information that may be retrieved based on data from the RTLS tags 102, such as a tag identifier, individual identifying data and/or tag placement data. Alternatively and/or additionally, in some embodiments, reference body distance data may be stored in the monitored individual database 114. Here, the RTLS tags 102 may be configured to transmit tag identifiers that may be dynamically associated with a particular individual based on comparing determined body distance data calculated based on the locations of the RTLS tags 102 to reference body distance data of each individual being monitored. The reference body distance data, for example, may also be stored in the monitored individual database 114.

In some embodiments, the data filter 111 is configured to send tag location data, other tag derived data, and sensor derived data to respective engines configured to process each type of data. For example, tag location data may be sent to a dynamics/kinetics engine 120 and sensor derived data may be sent to a sensor data engine 116.

The sensor data engine 116 may be configured to receive the sensor derived data from the data filter 111. The sensor data engine 116 is configured to process the sensor derived data, such as proximity data, accelerometer data, proximity data, health sensor data, payment or transaction data, etc. For example, the sensor data engine 116 may be configured to process proximity data to determine which NFC sensors are within near field communicable range, within close proximity, and/or in contact. Additionally or alternatively, the sensor data engine 116 processes accelerometer data to determine accelerations of an associated individual. By locating accelerometers at various locations of interest on the monitored individual (e.g., as shown in FIGS. 2A-2D), the sensor data engine 116 can estimate accelerations of individual body parts of an associated the monitored individual to determine a monitored individual activity (e.g., seated, cheering, walking, etc.).

In some embodiments, the sensor data engine 116 is configured to access a sensor data models database 118 to receive reference (e.g., historical and/or contextual) sensor data. For example, the reference sensor data may include reference proximity data indicating contextually significant proximity data. In some examples, reference proximity data indicates a contextual significance of a monitored individual coming into contact or proximity to a second monitored individual or a location (e.g., a patron coming into transaction proximity with a fixed or mobile merchant). In that sense, sensor derived data and reference sensor data may be used to provide finer determination of activities than may be possible using only tag location data.

In some embodiments, the sensor data engine 116 is configured to aggregate the sensor derived data received from a sensor over a period of time, such as over a play, a series of plays, a quarter, a football game, a convention, a concert, or other event occurring at a venue of interest. For example, aggregated proximity data may indicate individual transactions and movement patterns (e.g., individuals coming in proximity to merchants, mobile merchants, seat locations, etc.).

The example transceiver processing and distribution system 110 is configured to monitor, track, and/or store the sensor data. For example, the sensor data engine 116 may be configured to track aggregated proximity data, acceleration data and/or transaction data over time. In some examples, the sensor data engine 116 is configured to provide sensor data of interest or contextual significance, such as to an activity engine 124 or some other suitable computing device, such as a computing device and/or display device of a merchant, coach, venue manager, security official, or the like.

The example of FIG. 5 includes a dynamics/kinetics engine 120 configured to receive the tag location data from the data filter 111. The depicted dynamic/kinetics engine 120 is configured to determine activity data for the monitored individual based on the tag location data. For example, the activity data may indicate an action of the monitored individual (e.g., walking, running, catching, jumping, tackling, carrying a ball, cheering, etc.), characteristics of the activity (e.g., speed, acceleration, movement path over time, tackling power, force of a hit, timing of a tackle, etc.), and/or the location of the monitored individual with respect to the predetermined area (e.g., in-bounds, out-of bounds, in the end zone, outside of the end zone, past a first down marker, offside, near a mobile merchant, near a fixed merchant, near a venue display, near another venue position, etc.).

In some embodiments, the dynamics/kinetics engine 120 is configured to determine the activity data by comparing received tag location data with reference (e.g., historical and/or contextual) location data related to the monitored individual and/or similarly situated monitored individuals (e.g., other participants, other patrons, etc.). The reference location data may be stored in a dynamics/kinetics models database 122 and may be generated from capturing data from one or more monitored individuals. As such reference location data may be stored with an indication of an associated action. Additionally and/or alternatively, the reference location data may be input to the dynamics/kinetics models database 122 via a user input device.

In some embodiments, the dynamics/kinetics engine 120 and the sensor data engine 116 are configured to communicate with each other (and/or with the activity engine 124) to determine the activity data of the monitored individual. For example, the dynamics/kinetics engine 120 may indicate that a monitored individual is moving while the sensor data engine 116 may indicate that the monitored individual is passing a particular venue display. As such, the combination of tag location data and sensor derived data may indicate that the individual may be positioned to receive messaging via the venue display.

As illustrated, the transceiver processing and distribution system 110 includes the activity engine 124. The depicted activity engine 124 is configured to determine collective activity data for a plurality of monitored individuals (e.g., two or more monitored individuals wearing RTLS tags 102 at a venue). For example, for patrons at a sporting event (e.g., a football game), the collective activity data may comprise patron movement patterns relative to fixed merchant locations, mobile merchant locations, restrooms, security checkpoints, seating locations, and other venue regions of particular interest.

Additionally or alternatively, the monitored individuals are athletes participating in a sporting event such as football (i.e., on the football field shown at FIG. 1A). For example, the collective activity data may indicate the activity of a first monitored individual with respect to a second monitored individual (e.g., a player being hit, chased, blocked, etc.) or characteristics of that data (e.g., force of a collision). In some examples, the collective activity data indicates a formation of the offense or defense, a particular play being executed, whether a receiver was shoved out of bounds, or any other event involving multiple monitored individuals and having contextual significance. As such, the dynamics/kinetics engine 120 is configured to determine activity data for each the plurality of monitored individuals and to send the activity data to activity engine 124. Additionally and/or alternatively, the sensor data engine 116 is configured to send relevant sensor derived data of each monitored individual to the activity engine 124. For example, the activity engine 124 may be configured to determine the force of a tackle on a ball carrier.

In some embodiments, the activity engine 124 is configured to determine the occurrence of a particular event. Some example event occurrences, in the context of football, include a pass attempt, an incomplete pass, a completed pass, a touchdown, a first down, passing yardage, a tackle, a sack, an injury, an offside or false start, a late hit, stepping out of bounds, a rush attempt, yards per rush, presence or absence from the field for a particular play, and a potential injury. In some embodiments, the activity engine 124 is configured to receive one or more reference event occurrence data from the sensor data engine 116, the dynamics/kinetics engine 120, or other historical reference data database (not shown) that may be used for comparison to determine the occurrence of the event. In some embodiments, the activity engine 124 is configured to receive reference event occurrence data to determine the occurrence of the event, such as from the event occurrence data model database 126. For example, the reference event occurrence data may include associations of activity data and sensor derived data that indicate event occurrences of contextual significance.

In some embodiments, the activity engine 124 is configured to send event occurrence data indicating the determined event. The event occurrence data is sent, for example, to a computing device or display device of an announcer, broadcast producer or technician (e.g., for a television broadcast), the coaching staff, medical staff, trainers, a camera control module or the like. For example, event occurrence data may be sent to a computing device configured to record and/or analyze statistics of monitored individuals (e.g., number of catches, number of carries, yards per carry, number of tackles, number of sacks, etc.). In some embodiments, an alert is sent in response to a determination of a pre-defined event occurrence, unexpected event occurrence, and/or abnormal event occurrence. For example, an alert may be sent upon determining the monitored individual has been injured or is otherwise unfit to remain in the game.

As described herein, in response to the occurrence of certain activities, the activity engine 124 generates a unicast and/or a broadcast instruction to transmit to one or more wearable location devices 112. As one example, the activity engine 124 determines that a patron has requested assistance, such as by detecting the request included in the blink data transmitted by the RTLS tag 102 of the wearable location device 112 corresponding to the patron. In response, the activity engine 124 accesses the monitored individual database 114 to identify a monitored individual closest to the patron that matches the request for assistance (e.g., a paramedic). Accordingly, the activity engine 124 generates a unicast message to the wearable location device 112 associated with the identified monitored individual (e.g., the paramedic) to alert the identified monitored individual (e.g., the paramedic) regarding the requested assistance. The activity engine 124 then forwards the unicast message to the transceiver hub 108 for transmission.

As another example, the activity engine 124 determines that an image should be displayed by one or more wearable location devices 112 in response to a particular activity. For example, the image may include an indication of a score, an indication that an event, such as a touchdown or first down, has occurred, an advertisement, a request for medical attention, a visual accompaniment to a musical performance, and so on. Accordingly, the activity engine 124 interfaces with a crowd image engine 130 to generate a plurality of instructions that cause a plurality of wearable location devices 112 to emit light in a pattern that forms the image.

More particularly, the activity engine 124 instructs the crowd image engine 130 to produce a correlation between an image stored in an image database 134 and the wearable location devices 112 (e.g., the wristbands of FIGS. 2E and 2F having a light display). To this end, the crowd image engine 130 overlays the image over a region of the venue via the wearable location devices 112 located in that region. For example, if a patron requested medical assistance via a button on a wearable location device 112, the image may be a red cross centered at the location of the requesting patron. The crowd image engine 130 accesses the monitored individual database 114 to determine the location of each wearable location device 112 within the image region. In examples disclosed herein, for each wearable location device 112 within the image region, the crowd image engine 130 assigns the wearable location device 112 the overlaid image color at its location. The activity engine 124 obtains the assignments determined by the crowd image engine 130 and generates a plurality of corresponding instructions.

In some embodiments, based on the density of wearable location devices 112, there may be insufficient correspondence between locations of wearable location devices 112 and the image the activity engine 124 determined should be displayed. Accordingly, the crowd image engine 130 may apply a best fit algorithm to mitigate the impact of any gaps in the image. For example, the crowd image engine 130 may determine that one or more wearable location devices 112 that border the gap region should instead illuminate a transition color that is somewhere between the overlaid color at the location of the wearable location device 112 and the overlaid color in the gap region.

In some scenarios, the activity engine 124 determines that the displayed image is part of an animated image and/or a video. Accordingly, in these embodiments, the crowd image engine 130 determines a correlation between an overlaid color and the wearable location devices 112 for a plurality of time periods associated with the image. Further, in these scenarios, the activity engine 124 includes any timing information to produce the image animation in the generated instructions. In some embodiments, the animation is sufficiently long that to produce the animated image, the activity engine 124 generates and transmits multiple instructions for each wearable location device 112 over the course of the animation period.

In some embodiments, a monitored individual within the image region moves during the display of the image. Thus, the activity engine 124 and/or the crowd image engine 130 monitors the monitored individual database 114 to detect movement by monitored individuals within the image region. As the monitored individual moves within the image region, the monitored individual may be located at a location overlaid with a different image color (or no color at all, such as when the monitored individual leaves the image region). Accordingly, as the monitored individual moves about the venue, the crowd image engine 130 and the activity engine 124 coordinate to generate an instruction to cause the wearable location device 112 associated with the monitored individual to illuminate the appropriate color for the new location (or cease illuminating altogether). In some scenarios, when the monitored individual moves, a gap in the image forms where the monitored individual was previously located. Accordingly, the example crowd image engine 130 applies the aforementioned best fit techniques to fill in this gap.

Example Crowd Image Generation

Figure 6:
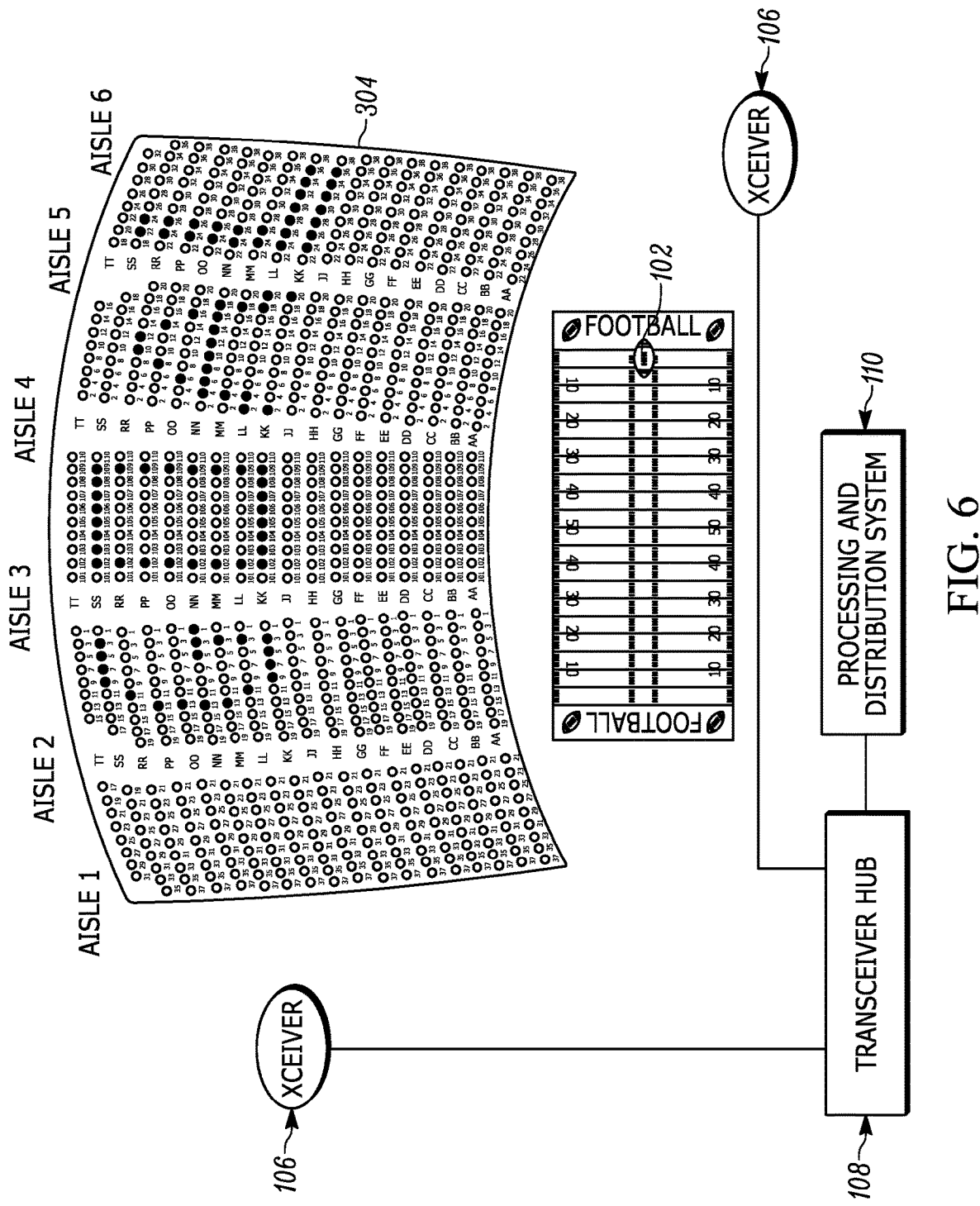
FIG. 6 illustrates an example image displayed by a plurality of wearable location devices in accordance with teachings of this disclosure.

FIG. 6 illustrates an example image 304 displayed by a plurality of wearable location device 112 in accordance with teachings of the present disclosure. In the illustrated scenario, a team scored a touchdown. In response, the example transceiver processing and distribution system 110 disclosed herein causes an image of the word "GOAL" to be displayed using the wearable location devices 112 worn by monitored individuals in the venue. Of course, other events may trigger the transceiver processing and distribution system 110 to cause the wearable location devices 112 to display other images. For example, the transceiver processing and distribution system 110 may cause display of an image in response to a time remaining in the event, a first down occurring, a player being penalized for being offside, a particular song or lyric being played at a concert, a request received from a patron, or any other event associated with a performance performed at the venue.

In the depicted example, the transceiver processing and distribution system 110 tracks the location of an RTLS tag 102 associated with a football. Accordingly, the example RTLS tag 102 transmits blink data to the transceiver 106 proximate to the end zone. As described with respect to FIG. 3A, the transceiver 106 routes the blink data to a transceiver hub 108, which, in turn, forwards the blink data and/or calculated location data to the transceiver processing and distribution system 110. Upon receiving the blink data and/or the calculated location data, the example transceiver processing and distribution system 110 routes the blink data and/or the calculated location data to an activity engine 124 which analyzes the received information to determine that the football has entered the end zone. In some example embodiments, the activity engine 124 determines that football is located at a location corresponding to the end zone. In some example embodiments, the activity engine 124 determines that the football has crossed a threshold defined by RTLS tags 102 corresponding to, for example, pylons placed at the goal line.

As described with respect to FIG. 5, the activity engine 124 interacts with a crowd image engine 130 to display the image 304 via the wearable location devices 112. As described above, the example activity engine 124 and/or the crowd image engine 130 determines a region of the venue to display the image 304 and identifies a plurality of wearable location devices 112 within the image region. Based on the location of the plurality of wearable location devices 112, the activity engine 124 and/or the crowd image engine 130 identifies a set of wearable location devices 112 that should emit light and/or emit light at a particular color to produce the image 304. Accordingly, the example activity engine 124 generates a plurality of instructions to cause the plurality of wearable location devices 112 to emit light and/or emit light at a particular color.

The example transceiver processing and distribution system 110 then routes the generated instructions to the transceiver hub 108 for routing to the plurality of wearable location devices 112. More particularly, the transceiver processing and distribution system 110 causes the generated instructions to be routed to one or more transceivers 106 that transmits into the image region to broadcast the generated instructions to a plurality of wearable location devices 112 within the image region. In response, the plurality of wristbands 112 may emit light and/or emit light at a particular color to form the image 304.

Figure 7A:
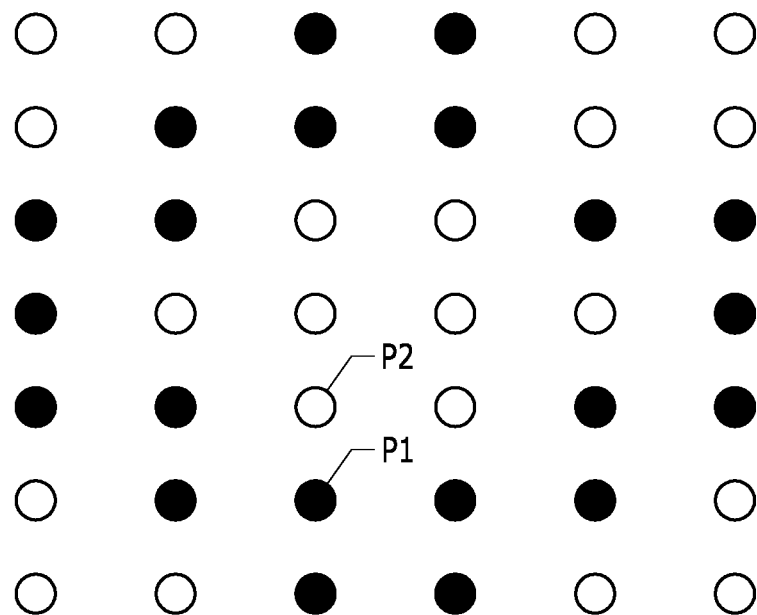
FIGS. 7A and 7B illustrate an example scenario where a crowd image is dynamically adjusted in response to movement by monitored individuals within an image region in accordance with teachings of this disclosure.
Figure 7B:
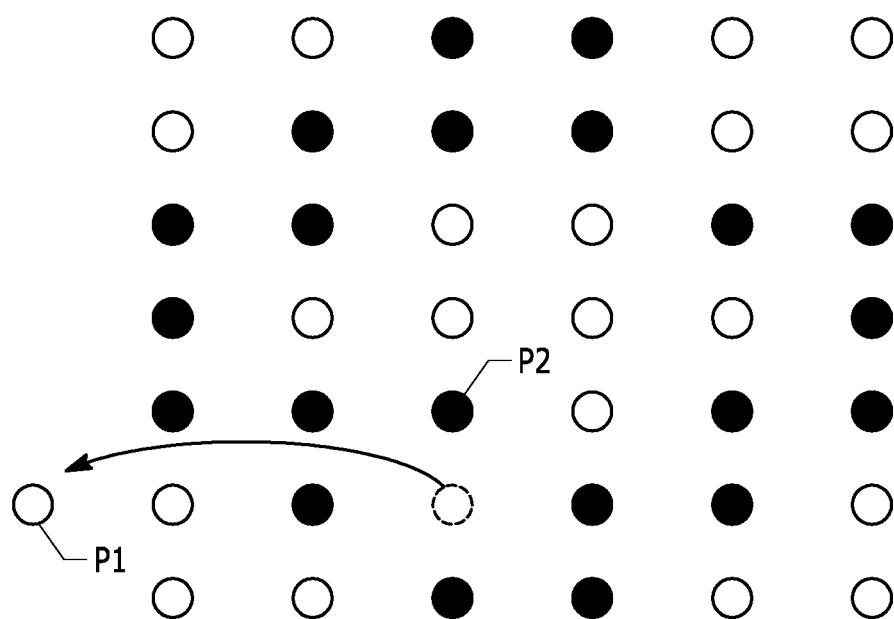

FIGS. 7A and 7B illustrate an example scenario where a crowd image is dynamically adjusted in response to movement by monitored individuals within an image region. FIG. 7A illustrates a plurality of wearable location devices 112 emitting light in an eye-shaped pattern. To this end, each illustrated circle represents a monitored individual equipped with a wearable location device 112. The circles that are filled represent wearable location devices 112 that are emitting light and/or emitting light at a first color. The other circles represent wearable location devices 112 that are not emitting light and/or emitting light at a second color.

As illustrated in FIG. 7B, a patron P1 moves to a new location while the image is being displayed. Accordingly, a transceiver processing and distribution system 110 detects that the patron P1 is no longer at her original location. As described with respect to FIG. 5, the transceiver processing and distribution system 110 generates and transmits an instruction that causes the wearable location device 112 associated with P1 to, depending on the particular image, to either cease emitting light or start emitting light at the second color.

As illustrated, the motion of P1 causes a gap to form in the image. As described above, the example transceiver processing and distribution system 110 utilizes a best fit algorithm to mitigate the impact of the gap. In the illustrated scenario, the best fit algorithm determined that the appropriate way to mitigate the gap is to cause the wearable location device 112 associated with a patron P2 to either emit light and/or emit light at the first color. In some other scenarios, the best fit algorithm may instead cause the wearable location device 112 associated with P2 to emit light at a transition color between the first and second colors, and/or alter the light emission for one or more other wearable location devices 112 proximate to the gap.

Figure 8:
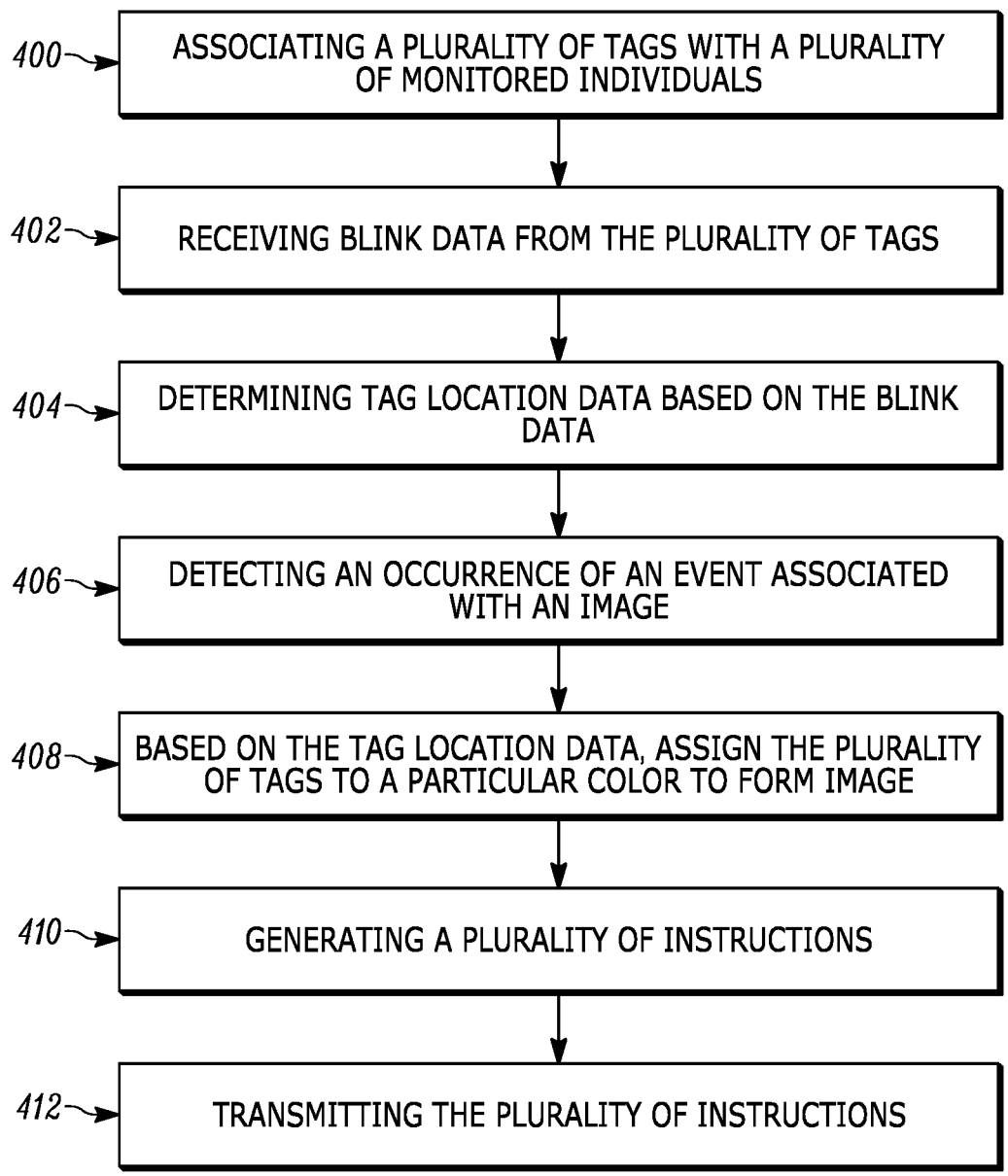
FIG. 8 illustrates a flowchart representative of example operations that may be executed to cause a plurality of locationing wearable location devices to emit light that forms an image as implemented by the transceiver processing and distribution system 110 of FIGS. 1A and/or 1B.

FIG. 8 is a flowchart representative of example operations that may be executed to cause a plurality of wearable location devices 112 of FIG. 1A or 1B to emit light that forms an image. As described herein, a venue is equipped with a transceiver processing and distribution system 110 that monitors the location of for a plurality of RTLS tags 102 located within a monitored area 101. The example wearable location devices 112 have an RTLS tag 102 disposed therein.

In the example of FIG. 8, the transceiver processing and distribution system 110 associates the plurality of tags 102 with a plurality of monitored individuals (block 400). As described with respect to FIG. 5, the associations may be tag-individual correlators stored at an example monitored individual database 114. To this end, the example monitored individual database 114 includes data records that correlate and/or associate a tag identifier for a tag 102, a role for the monitored individual, a monitored individual identifier, a location of a tag 102, and other monitored individual profile data described herein.

While the plurality of RTLS tags 102 are located within the monitored area 101, the example transceiver processing and distribution system 110 receives blink data from the plurality of RTLS tags 102 (block 402). As described with respect to FIGS. 3A-E, the plurality of RTLS tags 102 transmit the blink data to one or more transceivers 106 that route the blink data to a transceiver hub 108. The blink data may include an indication of a tag identifier, sensor data, a request generated by a monitored individual, a time stamp, and/or other data as described herein.

Based on the blink data, the transceiver processing and distribution system 110 determines tag location data for the plurality of RTLS tags 102 (block 404). In some embodiments, the transceiver hub 108 analyzes the blink data to determine the location for each RTLS tag 102. In these embodiments, the transceiver hub 108 transmits the correlations between each RTLS tag 102 and the determined location to the transceiver processing and distribution system 110. In some embodiments, the raw blink data is transmitted to the transceiver processing and distribution system 110. In these embodiments, the transceiver processing and distribution system 110 analyzes the blink data to determine the tag location. In either scenario, the example transceiver processing and distribution system 110 updates the monitored individual database 114 to indicated the current locations for the plurality of RTLS tags 102.

As described with respect to FIG. 5, the transceiver processing and distribution system 110 detects the occurrence of an event associated with an image (block 406). In some embodiments, the transceiver processing and distribution system 110 detects the event based on a timing associated with a performance at the venue (e.g., a concert, a halftime show, the end of a quarter or period). In other embodiments, transceiver processing and distribution system 110 detects the occurrence of the event based on the location data. For example, the location data may indicate that an RTLS tag 102 in a football has entered the end zone or that an RTLS tag 102 affixed to a participant has crossed a threshold defined by an RTLS tag 102 affixed to another participant. As another example, the transceiver processing and distribution system 110 may detect that the blink data includes a request for assistance (e.g., a monitored individual has requested assistance via a wearable location device 112). Regardless of the particular event, the example transceiver processing and distribution system 110 accesses a crowd image database 134 to determine an image to display for the detected event.

Based on the tag location data, the transceiver processing and distribution system 110 assigns the plurality of RTLS tags 102 disposed within a wearable location device 112 a particular color such that light emitted from the plurality of wearable location devices 112 forms the image (block 408). To display the image, transceiver processing and distribution system 110 determines a region of the venue on which to display the image and overlays the image on the determined region using the wearable location devices 112. The transceiver processing and distribution system 110 accesses the monitored individual database 114 to identify a set of wearable location devices 112 corresponding to tags 102 located within the determined region. For each of the wearable location devices 112 within the determined region, the transceiver processing and distribution system 110 identifies a color of the image overlaid at the location of the wearable location device 112 and assigns the wearable location device 112 the overlaid color. Because the transceiver processing and distribution system 110 assigns colors based on the determined location of the wearable location devices as opposed to a particular seat assignment, the present imaging techniques can be applied to venues that include general admission areas.

In some scenarios, the transceiver processing and distribution system 110 may identify a gap between the overlaid image and the location of wearable location devices 112 within the determined region. For example, the density of the wearable location devices 112 may be insufficient to properly display the determined image. As another example, a group of patrons within the determined region may have left their seats. To mitigate the impact of the gap, the example transceiver processing and distribution system 110 identifies a subset of wearable location devices 112 proximate to the gap in the image. In some embodiments, the transceiver processing and distribution system 110 assigns the subset of wearable location devices 112 a color overlaid at the location of the gap. In other embodiments, the transceiver processing and distribution system 110 assigns the subset of wearable location devices 112 a transition color between a first color overlaid at the location of the wearable location device 112 and a second color overlaid at the location of the gap.

As described herein a gap may also form when monitored individuals move while an image is already being displayed. To this end, the transceiver processing and distribution system 110 receives subsequent blink data from a first RTLS tag 102 corresponding to the monitored individual and determines a subsequent location for the first RTLS tag 102. Based on the subsequent location data, the transceiver processing and distribution system 110 determines that the first RTLS tag 102 is located at a new location and that a gap has formed at the prior location. For example, the transceiver processing and distribution system 110 may assume that when a particular tag moves a threshold distance (i.e., the distance between the original location and the subsequent location for the tag exceeds a threshold value), a gap in the image is formed. Accordingly, the example transceiver processing and distribution system 110 mitigates the impact of the gap by assigning wearable location devices 112 proximate to the gap a transition color or a color overlaid at the gap. The subsequent location of the first RTLS tag 102 can now be overlaid with a different color than the color the transceiver processing and distribution system 110 assigned to the first RTLS tag 102. The example transceiver processing and distribution system 110 assigns the first RTLS tag 102 the different color.

In some scenarios, the detected event corresponds to a series of images that form an animation instead of a static image. For example, the animation may be a light show to accompany a musical performance or an animated indication that a team has scored. In these scenarios, the transceiver processing and distribution system 110 assigns each wearable location device 112 a series of colors and corresponding timing data such that the animation is displayed by the plurality of wearable location devices 112. In these scenarios, the transceiver processing and distribution system 110 overlays a plurality of images that form the animation to determine a series of colors and timings to assign each wearable location device 112.

Upon determining the assignments between wearable location devices 112 and colors, the transceiver processing and distribution system 110 generates a plurality of instructions that are formatted to cause the wearable location devices 112 to, for example, emit light of the correlated color (block 410). To this end, each instruction may be a unicast message that identifies a particular wearable location device 112 and payload formatted in accordance with an API of the wearable location device 112. In embodiments in which an entire section is to emit the same color light (such as in a "white out" event), the transceiver processing and distribution system 110 may instead generate a broadcast message for wearable location devices 112 within that section. Additionally, in embodiments where the image is part of an animation, the transceiver processing and distribution system 110 includes a temporal component in the instruction that provides timing data for a series of colors to be emitted from the wearable location device 112.

Subsequently, the transceiver processing and distribution system 110 transmits the plurality of generated instructions to the wearable location devices 112 (block 412). In some examples, the transceiver processing and distribution system 110 identifies a transceiver 106 that services each wearable location device 112. In some examples, the transceiver hub 108 identifies a serving transceiver 106 that services the location of the wearable location device 112. In this example, the transceiver processing and distribution system 110 includes a location of the intended wearable location device 112 in the generated instructions. Accordingly, when the transceiver hub 108 receives the wearable location device 112 location, the transceiver hub 108 routes the instruction to the appropriate transceiver 106. In some examples, the transceiver hub 108 routes the instruction to all of the transceivers 106.

Additional Applications of Bi-Directional Communications

While the foregoing describes an example transceiver processing and distribution system 110 causing a plurality of wearable location devices 112 to emit light to form an image, these techniques can be applied to other scenarios that enhance the experience of monitored individuals.

In a first example, a coach or coordinator communicates a play or change of play to a wearable location device 112 worn by a participant. To this end, the coach may transmit the request to the transceiver processing and distribution system 110, such as via a computing device interconnected to the transceiver processing and distribution system 110. In response, the transceiver processing and distribution system 110 generates an instruction that causes a wearable location device 112 worn by a participant (e.g., a quarterback) to indicate the play or change in play via a display band. For example, the participant may understand that a red light corresponds to a first play and a green light corresponds to a second play. Additionally or alternatively, the participant may understand that a red light means that an audible should be called according to the coach.

In another example, field equipment, such as foul poles, first down or goal markers, or a goal post, include LEDs or other types of visual outputs. To this end, in addition or alternative to displaying a crowd image, the transceiver processing and distribution system 110 may cause, for example, a foul pole to illuminate when a ball enters foul territory, a first down marker to illuminate when the football crosses a threshold defined by the first down marker, a field goal post to illuminate when the football passes between the goalposts, a goal marker to illuminate when a football enters the end zone, or a hockey or soccer goalpost to illuminate when a puck or ball enters the goal. Accordingly, when the transceiver processing and distribution system 110 detects that a particular event has occurred, the transceiver processing and distribution system 110 generates and transmits an instruction to illuminate the field equipment in a manner similar to causing a wearable location device 112 to emit light.

In a further example, the transceiver processing and distribution system 110 causes a locationing wristband to emit light in a blinking pattern and/or vibrate to alert a monitored individual. In one example, a venue operator conducts a contest or lottery. In this example, the transceiver processing and distribution system 110 causes the wearable location device 112 of the winning patron to emit light and/or vibrate. In another example, an official wears a locationing wristband. Accordingly, when the transceiver processing and distribution system 110 detects that a foul or penalty has occurred, such as offside, illegal defense, or too many players on the field, the transceiver processing and distribution system 110 causes the wearable location device 112 worn by the official to vibrate and/or indicate the type of foul or penalty.

Similarly, in some examples, mobile merchants and paramedics wear wearable location devices 112. When a patron requests assistance from a mobile merchant or paramedic, the transceiver processing and distribution system 110 determines the closest available mobile merchant or paramedic. Accordingly, transceiver processing and distribution system 110 generates and transmits instructions to the determined mobile merchant or paramedic that cause the wearable location device 112 to vibrate and/or indicate the requesting patron and/or a location of the requesting patron. The transceiver processing and distribution system 110 may also cause the wearable location device 112 for the requesting patron to emit light in a particular pattern to make it easier for the mobile merchant or paramedic to locate the requesting patron.

As another example, the transceiver processing and distribution system 110 assists in controlling the flow of patrons as they traverse and/or ingress/egress the venue. For example, based on the density of tags 102 proximate to a particular venue facility, the transceiver processing and distribution system 110 estimates an approximate wait time to utilize the facility. Accordingly, when the transceiver processing and distribution system 110 receives an indication that a particular patron wants to use a particular type of facility and/or detects that the patron is approaching the venue, the transceiver processing and distribution system 110 causes the wearable location device 112 of the requesting patron to indicate a direction towards the facility associated with the shortest round-trip time based on the location of the requesting patron. In some implementations, a venue may include display screens at the end of an aisle or by section entrance/exit. Accordingly, in these embodiments, the example transceiver processing and distribution system 110 causes these display screen to display estimated wait times for facilities proximate to the display screen.

As still another example, the transceiver processing and distribution system 110 enhances the mobile merchant experience. For example, concessions, such as ice cream bars or hot dogs, carried by a mobile merchant need to be heated or cooled to a certain temperature for consumption. Accordingly, a temperature sensor associated with the mobile merchant transmits temperature data to the transceiver processing and distribution system 110. When the transceiver processing and distribution system 110 detects that the temperature of the concessions no longer meets the required temperature, the transceiver processing and distribution system 110 causes the wearable location device 112 associated with the mobile merchant to vibrate and/or indicate that the concessions can no longer be sold.

In other aspects of mobile merchant experience, the transceiver processing and distribution system 110 monitors the location of a plurality of mobile merchants to ensure that mobile merchants are appropriately distributed to optimally service the patrons at the venue. To this end, the transceiver processing and distribution system 110 obtains a feed of sales data to detect regions associated with unusual (e.g., greater or lesser than average) sales activity and to cause wearable location devices 112 associated with mobile merchants assigned area proximate to these regions to indicate the unusual activity. Additionally or alternatively, the transceiver processing and distribution system 110 monitors mobile merchant location to ensure that mobile merchants comply with sales routes and/or limitations on alcohol purchases. In some embodiments, the transceiver processing and distribution system 110 causes the wearable location device 112 or another wearable device worn by a mobile merchant to emit light in a particular manner to indicate that the mobile merchant's merchandise is on sale.

As yet another example, the transceiver processing and distribution system 110 may assist in finding group members. To this end, patrons may interact with a kiosk or another computing device to establish a group of tags to link together. This group information may be included in a monitored individual profile. Accordingly, a first group member may interact with a wearable location device 112 for assistance in locating a second group member. In response, the transceiver processing and distribution system 110 causes the wearable location device 112 of the first group member to indicate the location of the second group member. In some embodiments, the transceiver processing and distribution system 110 causes the wearable location device 112 of the second group member to indicate that the first group member is searching for her.

In still another example, the transceiver processing and distribution system 110 may be utilized to enforce access restrictions. For example, some areas at the venue may be VIP-only, a field of play is typically off-limits to patrons, stage hands may be restricted from entering the stands during a musical performance, and so on. Accordingly, the transceiver processing and distribution system 110 monitors the location data to detect that a monitored individual is not in a permitted region. In response, the transceiver processing and distribution system 110 causes a wearable location device 112 corresponding to security personnel proximate to the unauthorized monitored individual to indicate the location and/or identity of the unauthorized patron. In some embodiments, the transceiver processing and distribution system 110 causes the wearable location device 112 for the unauthorized monitored individual to emit light in a manner that calls attention to the unauthorized monitored individual.

It should be appreciated that in these examples, the transceiver processing and distribution system 110 accesses monitored individual profile data stored at the monitored individual database 114 to ensure that each monitored individual is provided an appropriate experience based on the profile data. In some embodiments, a monitored individual profile includes a phone number or another identifier of a mobile phone or other device corresponding to the monitored individual. The transceiver processing and distribution system can transmit additional feedback to the mobile phone of the monitored individual by querying the monitored individual profile and generating a message using the identifier.

Figure 9:
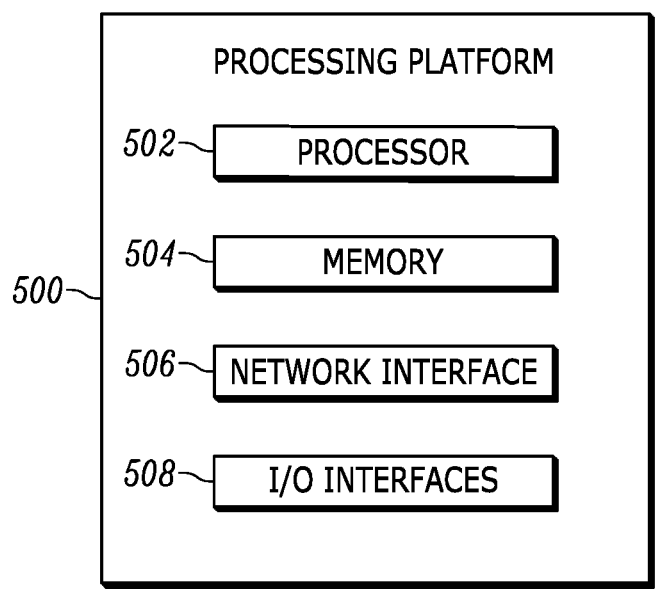
FIG. 9 is a block diagram of an example logic circuit capable of executing the example operations of FIG. 8 to implement the transceiver processing and distribution system 110 and/or one of the engines therein of FIGS. 1A, 1B, and/or 5.

FIG. 9 is a block diagram representative of an example logic circuit that may be utilized to implement, for example, the transceiver hub 108, the transceiver processing and distribution system 100 and/or, more particularly, the engines within the transceiver processing and distribution system 110 of FIG. 5. The example logic circuit of FIG. 9 is a processing platform 900 capable of executing instructions to, for example, implement the example operations represented by the flowcharts of the drawings accompanying this description. As described below, alternative example logic circuits include hardware (e.g., a gate array) specifically configured for performing operations represented by the flowcharts of the drawings accompanying this description.

The example processing platform 900 of FIG. 9 includes a processor 902 such as, for example, one or more microprocessors, controllers, and/or any suitable type of processor. The example processing platform 900 of FIG. 9 includes memory (e.g., volatile memory, non-volatile memory) 904 accessible by the processor 902 (e.g., via a memory controller). The example processor 902 interacts with the memory 904 to obtain, for example, machine-readable instructions stored in the memory 904 corresponding to, for example, the operations represented by the flowcharts of this disclosure. Additionally or alternatively, machine-readable instructions corresponding to the example operations of the flowcharts may be stored on one or more removable media (e.g., a compact disc, a digital versatile disc, removable flash memory, etc.) that may be coupled to the processing platform 900 to provide access to the machine-readable instructions stored thereon.

The example processing platform 900 of FIG. 9 includes a network interface 906 to enable communication with other machines or network elements via, for example, one or more networks. The example network interface 906 includes any suitable type of communication interface(s) (e.g., wired and/or wireless interfaces) configured to operate in accordance with any suitable protocol(s).

The example processing platform 900 of FIG. 9 includes input/output (I/O) interfaces 908 to enable receipt of user input and communication of output data to the user.

In the foregoing specification, specific embodiments have been described. However, one of ordinary skill in the art appreciates that various modifications and changes can be made without departing from the scope of the present teachings. Accordingly, the specification and figures are to be regarded in an illustrative rather than a restrictive sense, and all such modifications are intended to be included within the scope of present teachings.

In this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The above description refers to block diagrams of the accompanying drawings. Alternative implementations of the examples represented by the block diagrams include one or more additional or alternative elements, processes and/or devices. Additionally or alternatively, one or more of the example blocks of the diagrams may be combined, divided, re-arranged or omitted. Components represented by the blocks of the diagrams are implemented by hardware, software, firmware, and/or any combination of hardware, software and/or firmware. In some examples, at least one of the components represented by the blocks is implemented by a logic circuit. As used herein, the term "logic circuit" is expressly defined as a physical device including at least one hardware component configured (e.g., via operation in accordance with a predetermined configuration and/or via execution of stored machine-readable instructions) to control one or more machines and/or perform operations of one or more machines. Examples of a logic circuit include one or more processors, one or more coprocessors, one or more microprocessors, one or more controllers, one or more digital signal processors (DSPs), one or more application specific integrated circuits (ASICs), one or more field programmable gate arrays (FPGAs), one or more microcontroller units (MCUs), one or more hardware accelerators, one or more special-purpose computer chips, and one or more system-on-a-chip (SoC) devices. Some example logic circuits, such as ASICs or FPGAs, are specifically configured hardware for performing operations (e.g., one or more of the operations represented by the flowcharts of this disclosure). Some example logic circuits are hardware that executes machine-readable instructions to perform operations (e.g., one or more of the operations represented by the flowcharts of this disclosure). Some example logic circuits include a combination of specifically configured hardware and hardware that executes machine-readable instructions.

The above description refers to flowcharts of the accompanying drawings. The flowcharts are representative of example methods disclosed herein. In some examples, the methods represented by the flowcharts implement the apparatus represented by the block diagrams. Alternative implementations of example methods disclosed herein may include additional or alternative operations. Further, operations of alternative implementations of the methods disclosed herein may combined, divided, re-arranged or omitted. In some examples, the operations represented by the flowcharts are implemented by machine-readable instructions (e.g., software and/or firmware) stored on a medium (e.g., a tangible machine-readable medium) for execution by one or more logic circuits (e.g., processor(s)). In some examples, the operations represented by the flowcharts are implemented by one or more configurations of one or more specifically designed logic circuits (e.g., ASIC(s)). In some examples the operations of the flowcharts are implemented by a combination of specifically designed logic circuit(s) and machine-readable instructions stored on a medium (e.g., a tangible machine-readable medium) for execution by logic circuit(s).

As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, etc.) on which machine-readable instructions (e.g., program code in the form of, for example, software and/or firmware) can be stored. Further, as used herein, each of the terms "tangible machine-readable medium," "non-transitory machine-readable medium" and "machine-readable storage device" is expressly defined to exclude propagating signals. That is, as used in any claim of this patent, none of the terms "tangible machine-readable medium," "non-transitory machine-readable medium," and "machine-readable storage device" can be read to be implemented by a propagating signal.

As used herein, each of the terms "tangible machine-readable medium," "non-transitory machine-readable medium" and "machine-readable storage device" is expressly defined as a storage medium on which machine-readable instructions are stored for any suitable duration of time (e.g., permanently, for an extended period of time (e.g., while a program associated with the machine-readable instructions is executing), and/or a short period of time (e.g., while the machine-readable instructions are cached and/or during a buffering process)).

Although certain example apparatus, methods, and articles of manufacture have been disclosed herein, the scope of coverage of this patent is not limited thereto. On the contrary, this patent covers all apparatus, methods, and articles of manufacture fairly falling within the scope of the claims of this patent.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method comprising:
  receiving, via a receiver, first blink data transmitted from a first tag, the first tag carried by a first wearable location device associated with a monitored individual having a restricted region;
  determining tag location data based on the first blink data, the tag location data indicative of the monitored individual locations of the monitored individuals;
  determining if the monitored individual location is within the restricted region; and
  when the monitored individual location is within the restricted region:
    identifying a second tag associated with a security person in proximity to the monitored individual location, wherein identifying the second tag associated with the security person in proximity to the monitored individual location comprises:
      receiving, via the receiver, second blink data transmitted from the second tag, the second tag carried by a second wearable location device associated with the security person;
determining a second tag location data based on the second blink data, the second tag location data indicative of a security person location; and
determining if the security person location is within a threshold distance of the monitored individual location; and
alerting the security person via the second tag as to the monitored individual being located in the restricted region.

2. The method of claim 1, wherein alerting the security person via the second tag comprises:
generating an instruction configured to cause the second wearable location device to emit light of a particular color; and
transmitting the instruction to the second tag to cause the second wearable location device to emit the light of the particular color.

3. The method of claim 1, wherein alerting the security person comprises generating and sending a message to a mobile device of the security person.

4. The method of claim 1, wherein alerting the security person comprises changing a color to the second wearable location device of the security person.

5. The method of claim 1, wherein when the monitored individual location is within the restricted region, the method further comprises:
generating an instruction configured to cause the first wearable location device associated with the monitored individual to emit light of a particular color; and
transmitting the instruction to the first tag to cause the first wearable location device to emit the light of the particular color.

6. A hub comprising:
at least one processor; and
at least one memory storing computer readable instructions thereon, that, when executed by the at least one processor, cause the hub to:
receive first blink data from a first tag, the first tag carried by a first wearable location device associated with a monitored individual having a restricted region;
determine tag location data based on the first blink data, the tag location data indicative of the monitored individual locations of the monitored individuals;
determine if the monitored individual location is within the restricted region; and
when the monitored individual location is within the restricted region:
identify a second tag associated with a security person in proximity to the monitored individual location; wherein the hub identifying the second tag associated with the security person in proximity to the monitored individual location comprises:
receiving second blink data from the second tag, the second tag carried by a second wearable location device associated with the security person;
determining a second tag location data based on the second blink data, the second tag location data indicative of a security person location; and
determining if the security person location is within a threshold distance of the monitored individual location; and
alert the security person via the second tag that the monitored individual is located in the restricted region.

7. The hub of claim 6, wherein when the at least one processor causes the hub to alert the security person via the second tag comprises:
generate an instruction configured to cause the second wearable location device to emit light of a particular color; and
transmit the instruction to the second tag to cause the second wearable location devices to emit the light of the particular color.

8. The hub of claim 6, wherein alerting the security person comprises generating and sending a message to a mobile device of the security person.

9. The hub of claim 6, wherein alerting the security person comprises changing a color assigned to the second wearable location device of the security person.

10. The hub of claim 6, wherein, when the monitored individual location is within the restricted region, the at least one processor further causes the hub to:
generate an instruction configured to cause the first wearable location device associated with the monitored individual to emit light of a particular color; and
transmit the instruction to the first tag to cause the first wearable location device to emit the light of the particular color.

11. A system comprising:
a hub to receive first blink data and second blink data;
a first tag associated with a monitored individual having a restricted area, wherein the first tag transmits the first blink data;
a second tag associated with a security person, wherein the second tag transmits the second blink data;
wherein the hub is configured to:
determine a first tag location based on the first blink data,
compare the first tag location to the restricted area, and
when the first tag location is within the restricted area and the second blink data indicates that the security person is within a threshold distance from the first tag location, the hub alerts the security person via the second tag that the monitored individual is located in the restricted area.

12. The system of claim 11, wherein, when the monitored individual location is within the restricted area, the hub is further configured to:
generate an instruction configured to cause a first wearable location device associated with the monitored individual to emit light of a particular color; and
transmit the instruction to the first tag to cause the first wearable location device to emit the light of the particular color.

13. The system of claim 11, wherein when the hub alerts the security person, the hub is further configured to:
generate an instruction configured to cause a second wearable location device associated with the security person to emit light of a particular color; and
transmit the instruction to the second tag to cause the second wearable location device to emit the light of the particular color.

14. The system of claim 11, wherein when the hub alerts the security person, the hub generates and sends a message to a mobile device of the security person.

15. The system of claim 14, wherein the message includes at least one of the first tag location and an identity of the monitored individual.

16. The system of claim 11, wherein when the hub alerts the security person, the hub changes a color assigned to a second wearable location device of the security person.

17. The system of claim 11, wherein the restricted area is a VIP-only area.

18. The system of claim 11, wherein the restricted area is a hazardous area.

* * * * *